United States Patent
Estus et al.

(10) Patent No.: US 10,880,351 B1
(45) Date of Patent: Dec. 29, 2020

(54) SYSTEMS AND METHODS FOR ADAPTING CONTENT ITEMS TO ENDPOINT MEDIA DEVICES

(71) Applicant: DISH Network L.L.C., Englewood, CO (US)

(72) Inventors: Robert Estus, Centennial, CO (US); Kate Megan Carney Landow, Denver, CO (US); Jorg Nonnenmacher, Plascassier (FR)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 16/655,104

(22) Filed: Oct. 16, 2019

(51) Int. Cl.
  *G06F 15/16* (2006.01)
  *H04L 29/06* (2006.01)
  *H04N 21/24* (2011.01)
  *H04N 21/2343* (2011.01)
  *H04N 21/25* (2011.01)

(52) U.S. Cl.
  CPC .......... *H04L 65/602* (2013.01); *H04L 65/607* (2013.01); *H04N 21/23439* (2013.01); *H04N 21/2402* (2013.01); *H04N 21/251* (2013.01)

(58) Field of Classification Search
  CPC ... H04L 65/602; H04L 65/607; H04N 21/251; H04N 21/23439; H04N 21/2402
  USPC .................................................. 709/219, 231
  See application file for complete search history.

(56) References Cited

U.S. PATENT DOCUMENTS

| | | | |
|---|---|---|---|
| 7,242,406 B2 * | 7/2007 | Robotham | G06F 3/14 345/581 |
| 8,046,798 B1 | 10/2011 | Schlack et al. | |
| 8,190,674 B2 * | 5/2012 | Narayanan | H04L 65/60 709/203 |
| 8,667,527 B2 | 3/2014 | Yan et al. | |
| 8,855,681 B1 | 10/2014 | George et al. | |
| 8,918,636 B2 * | 12/2014 | Kiefer | H04N 21/2541 713/155 |
| 9,848,249 B2 | 12/2017 | Freed et al. | |
| 9,918,134 B2 * | 3/2018 | O'Hanlon | H04L 65/60 |
| 2002/0090198 A1 | 7/2002 | Rosenberg et al. | |
| 2006/0089870 A1 | 4/2006 | Myhr | |

(Continued)

OTHER PUBLICATIONS

U.S. Appl. No. 16/264,644, filed Jan. 31, 2019 Non Final Rejection dated Nov. 15, 2019, all pages.

(Continued)

*Primary Examiner* — Frantz B Jean

(57) ABSTRACT

Systems, methods, and machine-readable media for adapting content items to device operations of an endpoint media device are disclosed. A first content composite may be created by one or more processing devices for delivery in a packet stream from a content provider system via one or more networks, where the first content composite may include an adaptable content item corresponding to a set of one or more audio and/or video packets corresponding to audio and/or video content. The first content composite may be transmitted, where, consequent to delivery of the first content composite to a first endpoint media device or a second endpoint media device, the first endpoint media device or the second endpoint media device may perform one operation relating to a second content item of the first content composite, where the adaptable content item may be modified based on the second content item.

20 Claims, 8 Drawing Sheets

(56) References Cited

U.S. PATENT DOCUMENTS

| | | |
|---|---|---|
| 2008/0109307 A1 | 5/2008 | Ullah |
| 2008/0195457 A1 | 8/2008 | Sherman et al. |
| 2008/0300982 A1 | 12/2008 | Larson et al. |
| 2009/0044217 A1 | 2/2009 | Lutterbach et al. |
| 2009/0193126 A1 | 7/2009 | Agarwal et al. |
| 2010/0153983 A1 | 6/2010 | Philmon et al. |
| 2010/0179867 A1* | 7/2010 | Hughes .................. A63F 13/00 705/14.5 |
| 2012/0052941 A1 | 3/2012 | Mo |
| 2012/0254456 A1* | 10/2012 | Visharam ........... H04N 21/2343 709/231 |
| 2013/0174196 A1 | 7/2013 | Herlein |
| 2013/0326024 A1 | 12/2013 | Chen et al. |
| 2014/0101118 A1* | 4/2014 | Dhanapal ............. H04L 65/605 707/695 |
| 2014/0247931 A1 | 9/2014 | Swamy et al. |
| 2014/0351045 A1 | 11/2014 | Abihssira et al. |
| 2015/0020097 A1 | 1/2015 | Freed et al. |
| 2017/0118263 A1* | 4/2017 | Crabtree ............ H04N 21/8456 |
| 2017/0295503 A1 | 10/2017 | Govindaraju et al. |
| 2018/0295134 A1 | 10/2018 | Gupta et al. |

OTHER PUBLICATIONS

U.S. Appl. No. 16/383,300, filed Jan. 31, 2019 Notice of Allowance dated Apr. 21, 2020, all pages.

* cited by examiner

SYSTEMS AND METHODS FOR ADAPTING CONTENT ITEMS TO ENDPOINT MEDIA DEVICES

This disclosure generally relates to content delivery, and more particularly to systems and methods for adapting content items to endpoint media devices.

BACKGROUND

The evolution of wireless networks and content distribution platforms may present a number of challenges and problems for content delivery within packet streams per Internet Protocol (IP), the ATSC (Advanced Television Systems Committee) 3.0 standard, or a like protocol. Such modes of content delivery may not be linear, in contrast to traditional television delivery, for example. And, still, there are needs for deeper integration with endpoint devices in a broadcast environment. Content viewers are in need of better viewer experiences and more tailored service offerings.

Thus, there is a need for systems and methods that address such problems. This and other needs are addressed by the present disclosure.

BRIEF SUMMARY

Certain embodiments of the present disclosure relate generally to content delivery, and more particularly to systems and methods for adapting content items to endpoint media devices.

In one aspect, a method for adapting content items to device operations of an endpoint media device is disclosed. The method may include one or a combination of the following. A first content composite may be created by one or more processing devices for delivery in a packet stream from a content provider system via one or more networks, where the first content composite may include an adaptable content item corresponding to a set of one or more audio and/or video packets corresponding to audio and/or video content. Transmission of the first content composite may be caused, where, consequent to delivery of the first content composite to a first endpoint media device or a second endpoint media device, the first endpoint media device or the second endpoint media device may perform at least one operation relating to a second content item of the first content composite represented by one or more images, where the adaptable content item may be modified based at least in part on the second content item. At least one communication received from the first endpoint media device, the second endpoint media device, or a remote system that is remote from the one or more processing devices, the first endpoint media device, and the second endpoint media device, may be processed. The at least one communication may be indicative of the at least one operation relating to the second content item of the first content composite. Based at least in part on the processing the at least one communication, a set of observation data corresponding to indications of detected operations associated with the first endpoint media device and/or the second endpoint media device and mapped to a set of one or more content items may be aggregated. The set of one or more content items may include the second content item. Based at least in part on the set of observation data, a second content composite may be adapted so that the second content composite is modified based at least in part on a third content item. The second content composite may be provided for presentation facilitated by one or both of the first endpoint media device and the second endpoint media device.

In another aspect, a system to adapt content items to device operations of an endpoint media device is disclosed. The system may include one or more processing devices and memory communicatively coupled with and readable by the one or more processing devices and having stored therein processor-readable instructions which, when executed by the one or more processing devices, cause the one or more processing devices to perform one or a combination of the following. A first content composite may be created by one or more processing devices for delivery in a packet stream from a content provider system via one or more networks, where the first content composite may include an adaptable content item corresponding to a set of one or more audio and/or video packets corresponding to audio and/or video content. Transmission of the first content composite may be caused, where, consequent to delivery of the first content composite to a first endpoint media device or a second endpoint media device, the first endpoint media device or the second endpoint media device may perform at least one operation relating to a second content item of the first content composite represented by one or more images, where the adaptable content item may be modified based at least in part on the second content item. At least one communication received from the first endpoint media device, the second endpoint media device, or a remote system that is remote from the one or more processing devices, the first endpoint media device, and the second endpoint media device, may be processed. The at least one communication may be indicative of the at least one operation relating to the second content item of the first content composite. Based at least in part on the processing the at least one communication, a set of observation data corresponding to indications of detected operations associated with the first endpoint media device and/or the second endpoint media device and mapped to a set of one or more content items may be aggregated. The set of one or more content items may include the second content item. Based at least in part on the set of observation data, a second content composite may be adapted so that the second content composite is modified based at least in part on a third content item. The second content composite may be provided for presentation facilitated by one or both of the first endpoint media device and the second endpoint media device.

In yet another aspect, one or more non-transitory, machine-readable media are disclosed. The one or more non-transitory, machine-readable media may have machine-readable instructions thereon which, when executed by one or more processing devices, cause the one or more processing devices to perform one or a combination of the following. A first content composite may be created by one or more processing devices for delivery in a packet stream from a content provider system via one or more networks, where the first content composite may include an adaptable content item corresponding to a set of one or more audio and/or video packets corresponding to audio and/or video content. Transmission of the first content composite may be caused, where, consequent to delivery of the first content composite to a first endpoint media device or a second endpoint media device, the first endpoint media device or the second endpoint media device may perform at least one operation relating to a second content item of the first content composite represented by one or more images, where the adaptable content item may be modified based at least in part on the second content item. At least one communication received from the first endpoint media device, the second endpoint media device, or a remote system that is remote from the one or more processing devices, the first endpoint media device, and the second endpoint media device, may be processed. The at least one communication may be indicative of the at least one operation relating to the second content item of the first content composite. Based at least in part on the processing the at least one communication, a set of observation data corresponding to indications of detected operations associated with the first endpoint media device and/or the second endpoint media device and mapped to a set of one or more content items may be aggregated. The set of one or more content items may include the second content item. Based at least in part on the set of observation data, a second content composite may be adapted so that the second content composite is modified based at least in part on a third content item. The second content composite may be provided for presentation facilitated by one or both of the first endpoint media device and the second endpoint media device.

In various embodiments, the content composite may be created least in part by configuring a containerization object with a container flag that indicates the adaptable content item and containerization specifications to facilitate performance of a set of one or more operations by the first endpoint media device and/or the second endpoint media device with respect to the adaptable content item consequent to the delivery of the content composite. In various embodiments, the at least one operation relating to the second content item may correspond to a selection of a user-selectable interface element mapped to the second content item. In various embodiments, consequent to the selection of a user-selectable interface element mapped to the second content item, at least a portion of the second content item may be transferred to one or both of the first endpoint media device and the second endpoint media device.

In various embodiments, the at least one operation relating to the second content item may correspond to an image capture of at least a portion of an image facilitated by the second content item. In various embodiments, based at least in part on the aggregated set of observation data, one or more metrics of media device interactions with a set of one or more content composites may be learned by the one or more processing devices, and the one or more metrics may be mapped to the first endpoint media device and/or the second endpoint media device. The adapting the second content composite may be based at least in part on the learned one or more metrics of media device interactions. In various embodiments, the one or more metrics of media device may correspond to indicia of one or more times of: the first endpoint media device and/or the second endpoint media device having output the second content item for display, and/or a selection of a user-selectable interface element mapped to the second content item Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment of the disclosure. It should be understood that various changes may be made in the function and arrangement of elements without departing from the spirit and scope of the disclosure as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Various embodiments will now be discussed in greater detail with reference to the accompanying figures, beginning with FIG. 1.

Figure 1:
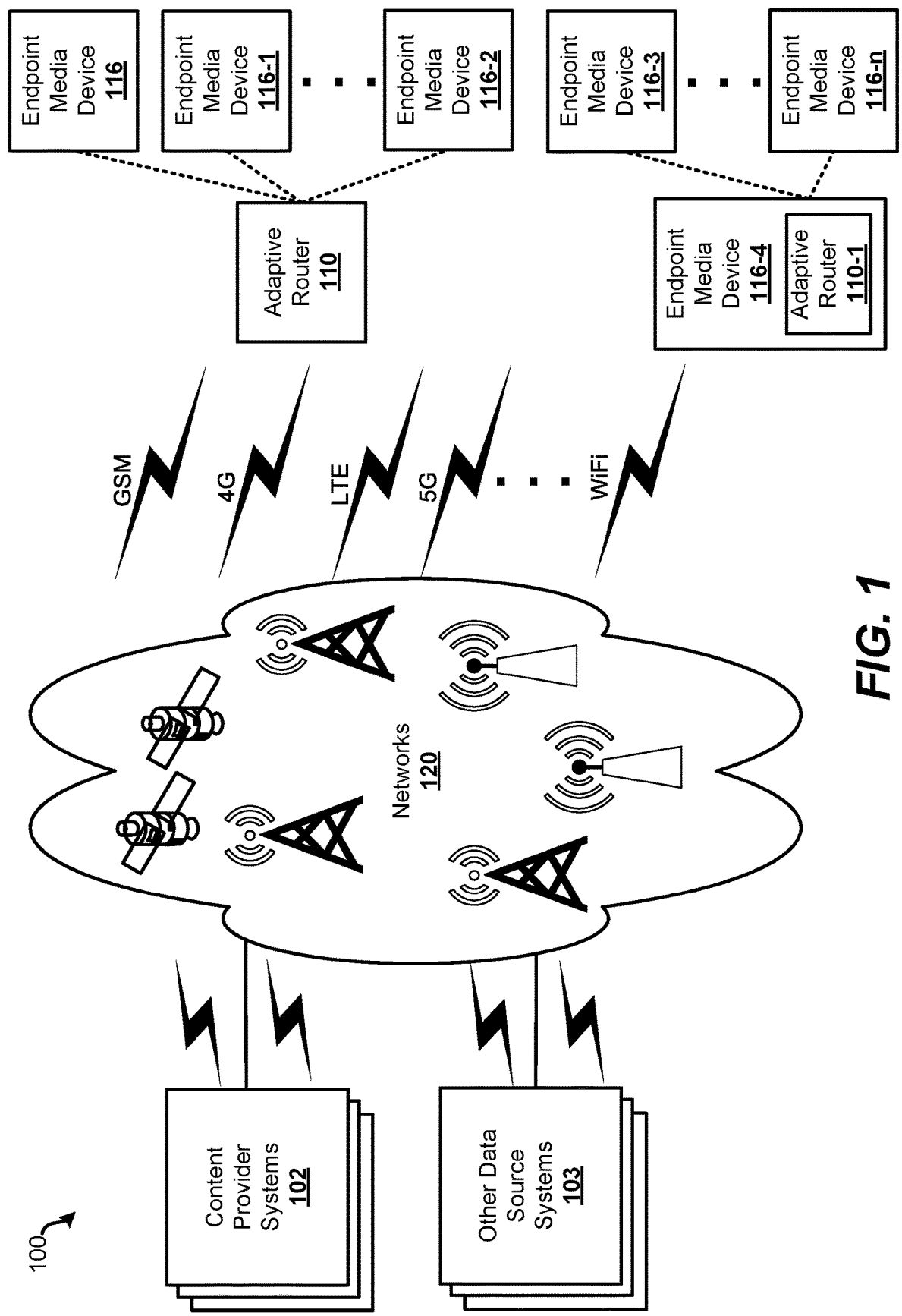
FIG. 1 illustrates a content distribution system, in accordance with disclosed embodiments of the present disclosure.

FIG. 1 illustrates a content distribution system 100, in accordance with disclosed embodiments of the present disclosure. For brevity, system 100 is depicted in a simplified and conceptual form, and may generally include more or fewer systems, devices, networks, and/or other components as desired. Further, the number and types of features or elements incorporated within the system 100 may or may not be implementation-specific, and at least some of the aspects of the system 100 may be similar to a cable television distribution system, an IPTV (Internet Protocol Television) content distribution system, and/or another type of media or content distribution system.

In general, the system 100 may include a plurality of networks 120 that can be used for bi-directional communication paths for data transfer between components of system 100. Disclosed embodiments may transmit and receive data, including video content, via the networks 120 using any suitable protocol(s), as is disclosed in co-pending U.S. patent application Ser. No. 16/383,300, filed Apr. 12, 2019, the disclosure of which application is incorporated by reference herein in its entirety for all purposes, as if fully set forth herein. The networks 120 may be or include one or more next-generation networks (e.g., 5G wireless networks and beyond). Further, the plurality of networks 120 may correspond to a hybrid network architecture with any number of terrestrial and/or non-terrestrial networks and/or network features, for example, cable, satellite, wireless/cellular, or Internet systems, or the like, utilizing various transport technologies and/or protocols, such as radio frequency (RF), optical, satellite, coaxial cable, Ethernet, cellular, twisted pair, other wired and wireless technologies, and the like. In various instances, the networks 120 may be implemented with, without limitation, satellite communication with a plurality of orbiting (e.g., geosynchronous) satellites, a variety of wireless network technologies such as 5G, 4G, LTE (Long-Term Evolution), 3G, GSM (Global System for Mobile Communications), another type of wireless network (e.g., a network operating under Bluetooth®, any of the Institute of Electrical and Electronics (IEEE) 802.11 suite of protocols, and/or any other wireless protocol), a wireless local area network (WLAN), a HAN (Home Area Network) network, another type of cellular network, the Internet, a wide area network (WAN), a local area network (LAN) such as one based on Ethernet, Token-Ring and/or the like, such as through etc., a gateway, and/or any other appropriate architecture or system that facilitates the wireless and/or hardwired packet-based communications of signals, data, and/or message in accordance with embodiments disclosed herein. In various embodiments, the networks 120 and its various components may be implemented using hardware, software, and communications media such wires, optical fibers, microwaves, radio waves, and other electromagnetic and/or optical carriers; and/or any combination of the foregoing and/or the like. In some embodiments, the networks 120 may include a telephone network that may be circuit switched, package switched, or partially circuit switched and partially package switched. For example, the telephone network may partially use the Internet to carry phone calls (e.g., through VoIP). In various instances, the networks 120 may transmit data using any suitable communication protocol(s), such as TCP/IP (Transmission Control Protocol/ Internet protocol), SNA (systems network architecture), IPX (Internet packet exchange), UDP, AppleTalk, and/or the like.

The system 100 may include one or more content provider systems 102, one or more other data source systems 103, and media devices including adaptive routers 110 and various endpoint devices 116. Many embodiments may include a large number of content provider systems 102, data source systems 103, and/or such media devices. The one or more content provider systems 102 may include one or more television service provider systems. The content provider systems 102 may distribute broadcast video content to the endpoint devices 116 via one or more networks of the networks 120 and the adaptive routers 110. For example, a content provider system 102 may be configured to stream, via the networks 120, television channels, on-demand programming, movies, other shows, television programs or portions of television programs following and/or during a live broadcast of the television programs, an content and commercials, programming information (e.g., table data, electronic programming guide (EPG) content, etc.), and/or other services to endpoint devices 116 via satellite, 5G, 4G, and/or LTE wireless communication protocols and network components, in accordance with embodiments disclosed herein.

A content provider system 102 with satellite transmitter equipment, satellite uplink, and/or other network routing equipment that may, for example, be operated by a television service provider. The content provider system 102 may receive feeds of one or more television channels from various sources. Such television channels may include multiple television channels that contain the same content (but may be in different formats, such as high-definition and standard-definition). To distribute such video content to endpoint devices 116, feeds of the video content may be relayed to the adaptive routers 110 and the endpoint devices 116 via one or more satellites in the form of transponder streams or transmitted to the adaptive routers 110 and the endpoint devices 116.

The data source systems 103 may correspond to any suitable sources of data such as one or more computer systems, databases, websites, portals, any repositories of data in any suitable form, server systems, other endpoint devices like endpoint devices 116 but functioning as data sources, and/or the like. In some instances, the data source systems 103 may include one or more mobile computing device locator services that provide information regarding the location of one or more of the endpoint devices 116 and/or the adaptive routers 110. In various instances, the data source systems 103 may provide various details relating to IP addresses, cellular tower identification and location data, mobile device triangulation data, LAN identification data, Wi-Fi identification data, access point identification and location data, and/or the like data that facilitates location of one or more of the endpoint devices 116 and/or the adaptive routers 110.

In various embodiments, the data from one or more of the data source systems 103 may be retrieved and/or received by a television service provider system 102 via one or more data acquisition interfaces through network(s) 120 and/or through any other suitable means of transferring data. In various embodiments, the television service provider system 102 the data source systems 103 could use any suitable means for direct communication. In various embodiments, the television service provider system 102 may actively gather and/or pull from one or more of the data source systems 103. Additionally or alternatively, the television service provider system 102 may wait for updates from one or more of the data source systems 103. The data collected (location data, IP address, etc.) may be curated so that only the data necessary for the transaction is collected. The one or more data acquisition interfaces may include one or more application programming interfaces (APIs) that define protocols and routines for interfacing with the data source systems 103. The APIs may specify application programming interface (API) calls to/from data source systems 103. In some embodiments, the APIs may include a plug-in to integrate with an application of a data source systems 103. The data acquisition interfaces, in some embodiments, could use a number of API translation profiles configured to allow interface with the one or more additional applications of the data sources to access data (e.g., a database or other data store) of the data source systems 103. The API translation profiles may translate the protocols and routines of the data source systems 103 to integrate at least temporarily with the system and allow communication with the system by way of API calls.

Figure 2:
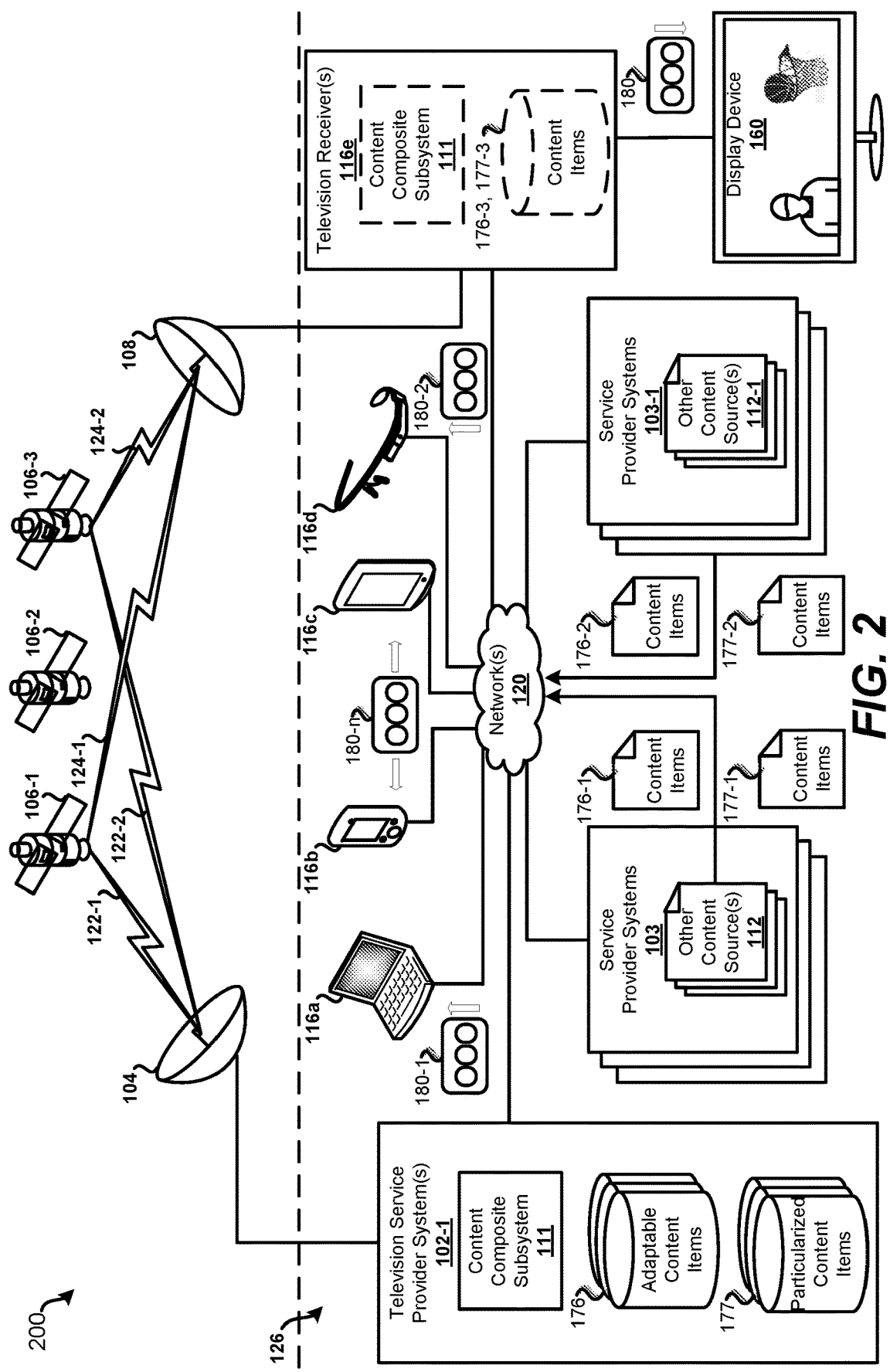
FIG. 2 further illustrates a content distribution system, in accordance with disclosed embodiments of the present disclosure.

FIG. 2 illustrates a content distribution system 200, in accordance with disclosed embodiments of the present disclosure. In various embodiments, the system 200 may correspond to an example system that may encompass all or part of the content distribution system 100 and that illustrates certain features of disclosed embodiments. Again, for brevity, system 200 is depicted in a simplified and conceptual form, and may generally include more or fewer systems, devices, networks, and/or other components as desired. Further, the number and types of features or elements incorporated within the system 200 may or may not be implementation-specific, and at least some of the aspects of the system 200 may be similar to a cable television distribution system, an IPTV (Internet Protocol Television) content distribution system, and/or any other type of media or content distribution system.

The system 200 may include content provider system 102-1, satellite uplink 104, a plurality of orbiting (e.g., geosynchronous) satellites 106, satellite receiver 108, one or more computing devices 116a-d, one or more television receivers 116e, one or more content sources 112 (e.g., online content sources), and service provider systems 103-1. In various embodiments, one or a combination of the one or more computing devices 116a-d, one or more television receivers 116e, and/or one or more display devices 160 may correspond to endpoint media devices 116.

The content provider system 102-1 and satellite transmitter equipment (which may include the satellite uplink 104) may be operated by a television service provider. A television service provider may distribute television channels, on-demand programming, programming information, and/or other services to users via satellite. The content provider system 102-1 may receive feeds of one or more television channels from various sources. Such television channels may include multiple television channels that contain the same content (but may be in different formats, such as high-definition and standard-definition). To distribute such television channels to users, feeds of the television channels may be relayed to user equipment via one or more satellites in the form of transponder streams. Satellite transmitter equipment may be used to transmit a feed of one or more television channels from the content provider system 102-1 to one or more satellites 106. While a single content provider system 102-1 and satellite uplink 104 are illustrated as part of the television distribution system 200, it should be understood that multiple instances of transmitter equipment may be used, possibly scattered geographically to communicate with satellites 106. Such multiple instances of satellite transmitting equipment may communicate with the same or with different satellites 106.

The television receivers 116e, as described throughout, may generally be any type of television receiver (such as an STB (set-top box), for example) configured to decode signals received for output and presentation via a display device 160. In another example, television receiver 116e (which may include another remote television receiver 116e) may be integrated as part of or into a television, a DVR, a computing device, such as a tablet computing device, or any other computing system or device, as well as variations thereof. In some embodiments, a television receiver 116e may be a component that is added into the display device 160, such as in the form of an expansion card. A television receiver 116e and network 120 together with television receivers 116e and/or one or more computing devices 116, may form at least a portion of a particular home computing network, and may each be respectively configured such as to enable communications in accordance with any particular communication protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-Bandwidth Digital Content Protection), etc. While only a limited number of television receivers 116e, display devices 160, computing devices 116, etc. are illustrated, it should be understood that multiple (e.g., tens, thousands, millions) instances of such equipment, corresponding to various users in various geolocations, may be included the system 200.

In some embodiments, broadcast television programs may be delivered to television receivers, including a television receiver 116e, via satellite according to a schedule. On-demand content may also be delivered to a television receiver 116e via satellite. Satellites 106 may be configured to receive uplink signals 122 from satellite uplink 104. In this example, uplink signals 122 may contain one or more transponder streams of particular data or content, such as particular television channels, each of which may be supplied by content provider system 102-1. For example, each of uplink signals 122 may contain various media content such as HD (High Definition) television channels, SD (Standard Definition) television channels, on-demand programming, programming information (e.g., table data), and/or any other content in the form of at least one transponder stream, and in accordance with an allotted carrier frequency and bandwidth. In this example, different media content may be carried using different satellites of satellites 106. Further, different media content may be carried using different transponders of a particular satellite (e.g., satellite 106-1); thus, such media content may be transmitted at different frequencies and/or different frequency ranges. For example, a first television channel and a second television channel may be carried on a first carrier frequency over a first transponder (as part of a single transponder stream) of satellite 106-1, and a third, fourth, and fifth television channel may be carried on a second carrier frequency (as part of another transponder stream) over a transponder of satellite 106-3, or, the third, fourth, and fifth television channel may be carried on a second carrier frequency over a second transponder of satellite 106-1, etc.

The satellites 106 may be further configured to relay uplink signals 122 to the satellite receiver 108 as downlink signals 124. Similar to the uplink signals 122, each of the downlink signals 124 may contain one or more transponder streams of particular data or content, such as various encoded and/or at least partially scrambled television channels, on-demand programming, etc., in accordance with an allotted carrier frequency and bandwidth. The satellite receiver 108, which may include a satellite dish, a low noise block (LNB), and/or other components, may be provided for use to receive television channels, such as on a subscription basis, distributed by the content provider system 102-1 via the satellites 106. For example, the satellite receiver 108 may be configured to receive particular transponder streams as downlink signals 124, from one or more of the satellites 106. Based at least in part on the characteristics of a given television receiver 116e and/or satellite receiver 108, it may only be possible to capture transponder streams from a limited number of transponders of the satellites 106 concurrently. For example, a tuner of the television receiver 116e may only be able to tune to a single transponder stream from a transponder of a single satellite, such as the satellite 106-1, at a time.

The television receiver 116e, which may be communicatively coupled to the satellite receiver 108, may subsequently select, via a tuner, decode, and relay television programming to a television for display thereon. Broadcast television programming or content may be presented "live," or from a recording as previously stored on, by, or at the television receiver 116e. For example, an HD channel may be output to a television by the television receiver 116e in accordance with the HDMI/HDCP content protection technologies. Other embodiments are possible. For example, in some embodiments, an HD channel may be output to a television in accordance with the MoCA® (Multimedia over Coax Alliance) home entertainment networking standard. Other embodiments are possible.

The television receiver 116e may select via tuner, decode, and relay particular transponder streams to one or more of television receivers 116e, which may in turn relay particular transponder streams to one or more display devices 160. For example, the satellite receiver 108 and the television receiver 116e may, respectively, be configured to receive, decode, and relay at least one television channel to a television by way of a television receiver 116e. Similar to the above-example, a television channel may generally be presented "live," or from a recording as previously stored by the television receiver 116e, and may be output to the display device 160 by way of the television receiver 116e in accordance with a particular content protection technology and/or networking standard. Other embodiments are possible.

In various embodiments, the content resources may be used to provide the television receiver 116e with content (e.g., television programming). The content resources may be used to retrieve television programs or portions of television programs following and/or during a live broadcast of the television programs. The content resources may include the content provider system 102-1, the service provider systems 103-1, the online content sources 112, one or more other television receivers 116e, and/or the like.

The content provider system 102-1, which may distribute broadcast television programming to the television receivers 116e via a satellite-based television programming distribution arrangement (or some other form of television programming distribution arrangement, such as a cable-based network, fiber-based network, or IP-based network), may use an alternate communication path, such as via the network 120, to provide television programming to the television receivers 116e. The television receivers 116e may be permitted to request various television programs or portions of television programs from the content provider system 102-1 via the network 120. For instance, the content provider system 102-1 may be permitted to transmit a portion of a television program or an entire television program during and/or after a time at which the television program was broadcast live by the television service provider via a satellite-based television programming distribution arrangement.

In some embodiments, the content provider system 102-1 may provide a television program via on-demand content. On-demand content may be included in a user's subscription or may be provided on a per-request basis. Such on-demand content may be provided via the satellite-based distribution arrangement and/or via the network 120. On-demand content provided via the satellite-based distribution arrangement may be stored locally by the television receiver 116e to allow on-demand access. On-demand content may also be retrieved via the network 120 from the content provider system 102-1.

The computing devices 116a-d represent various computerized devices that may or may not be associated with a user of the television receiver 116e and that may be configured to facilitate various adaptive content features disclosed in various embodiments herein. As indicated by 116a, the computing devices 116a-d may include a laptop computer, a desktop computer, a home server, or another similar form of computerized device. As indicated by 116b and 116c, the computing devices 116a-d may include a cellular phone and/or smartphone, a tablet computer, or another similar form of mobile device. As indicated by 116d, the computing devices 116a-d may include smart glasses or another similar form of wearable computing device.

In various embodiments, the television receiver 116e may be provided with access credentials that allow access to content stored and/or accessible through one or more of the computing devices 116a-d. Likewise, in various embodiments, one or more of the computing devices 116a-d may be provided with access credentials that allow access to content stored and/or accessible through the television receiver 116e and/or account associated therewith and/or associated with an application installed on the one or more of the computing devices 116a-d. It should be understood that computing devices 116a-d are exemplary in nature. Content may be accessible through a lesser or greater number of computerized devices associated with a user of the television receiver 116e.

In some embodiments, the online content sources 112 may represent content resources through which content may be retrieved by the endpoint media devices 116 via the network 120. Content available through the online content sources 112 may be available for free and not require subscription (a username and/or password may or may not be necessary). Each of the online content sources 112 may represent different websites available via the Internet. For example, some content may be legally made available for free (such as television programming provided by government-funded sources, e.g., the BBC or Hulu®). Periodically, the endpoint media devices 116 may poll online content sources 112 to determine which content is available and/or which content is scheduled to be available in the future. In some embodiments, the endpoint media devices 116 may poll online content sources 112 regarding the availability of at least a portion of a specific show.

The service provider systems 103-1 may correspond to one or more data sources 112 that are any suitable source of data to facilitate embodiments disclosed further herein. In various embodiments, the service provider systems 103-1 may include one or more computer systems, a database, a website, a portal, any repository of data in any suitable form, a server system, and/or the like. With some embodiments, the data sources 112 may include one or more mobile computing device locator services that provide information regarding the location of one or more computing devices 116a-d. With some embodiments, the data sources 112 may provide various details relating to IP addresses, cellular tower identification and location data, mobile device triangulation data, LAN identification data, Wi-Fi identification data, access point identification and location data, and/or the like data that facilitates location of one or more computing devices 116a-d. With some embodiments, the data sources 112 may provide demographic data about an area encompassing the location of one or more computing devices 116a-d.

In various embodiments, the data from the one or more data sources 112 may be retrieved and/or received by the content provider system 102-1 and/or the subsystem(s) 111 via one or more data acquisition interfaces through network(s) 120 and/or through any other suitable means of transferring data. In various embodiments, the content provider system 102-1 and/or the subsystem(s) 111 and the data sources 112 could use any suitable means for direct communication. The one or more data acquisition interfaces may include one or more application programming interfaces (APIs) that define protocols and routines for interfacing with the data sources 112. The APIs may specify application programming interface (API) calls to/from service provider systems 103-1. In some embodiments, the APIs may include a plug-in to integrate with an application of a service provider system 103-1. The data acquisition interfaces, in some embodiments, could use a number of API translation profiles configured to allow interface with the one or more additional applications of the data sources to access data (e.g., a database or other data store) of the data sources 112. The API translation profiles may translate the protocols and routines of the service provider system 103-1 to integrate at least temporarily with the system and allow communication with the system by way of API calls. Data, as referenced herein, may correspond to any one or combination of raw data, unstructured data, structured data, information, and/or content which may include media content, text, documents, files, instructions, code, executable files, images, video, audio, and/or any other suitable content suitable for embodiments of the present disclosure.

Although FIG. 2 illustrates an example that includes a satellite-based television channel distribution system, it should be understood that at least some of the aspects of such a system may be similar to a cable television distribution system, an IPTV content distribution system, and/or any other type of media or content distribution system. For example, in a cable television system, rather than using satellite transponders, multiple RF channels on a cable may be used to transmit streams of television channels. As such, aspects detailed herein may be applicable to cable television distribution systems.

Further, the content provider system 102-1 may include one or more content server systems configured to stream television programming, including televised events such as sports events, to the computing devices 116 via the network 120. When the streaming content servers stream content to the computing devices 116, the stream content may be processed and displayed by the computing devices 116 using one or more applications installed on the computing devices 116. Some such streaming services may require a subscription and may require user authentication, e.g., with a username and/or password which may or may not be associated with an account map to the television receiver 116e. Accordingly, the streaming services may make a television program available for streaming or download during the live broadcast of the television program.

The television receiver 116e may be able to retrieve at least a portion of a television program through other television receivers 116e, which can function as content resources. Similarly, the television receiver 116e may be able to cast at least a portion of a television program through other television receivers 116e and/or to computing devices 116. For instance, a Slingbox® (or other form of media streaming device) functioning in concert with a television receiver 116e may permit television programs to be captured and streamed over the network 120. In some embodiments, the television receivers 116e may have such media streaming capabilities integrated. In some embodiments, the television receivers 116e may cast programming content to the computing devices 116 via wireless signals. For example, the programming content from the television receiver 116e may be indirectly transmitted via a local network (e.g., via Wi-Fi) or directly transmitted to the computing device 116 via a casting device integrated with the television receiver 116e or coupled to the television receiver 116e (e.g., via a dongle). In some embodiments, the programming content may be cast to the computing device 116 via a wired connection (e.g., via one or more of HDMI, USB, lightning connector, etc.). Some embodiments of the television receivers 116e may provide for simulcasting such that the same programming that is being displayed on the display device 160 is being displayed on one or more of the computing devices 116 simultaneously or substantially simultaneously.

A user may be able to obtain at least a portion of a television program via the television receivers 116e, which may be associated with other users or with the same user. For instance, the user may have multiple television receivers 116e at different locations. Periodically, the television receiver 116e may poll the other television receivers 116e to determine which television programs are available and/or which television programs are scheduled to be available in the future. In some embodiments, the television receiver 116e may poll the television receivers 116e regarding the availability of at least a portion of a specific television program.

Thus, while network configuration data may be broadcast repeatedly via satellite to television receivers 116e, it should be understood that a similar arrangement may be used in cable-based television programming broadcast networks to broadcast network configuration. For any of the various type of network, various other forms of data may be transmitted via an Internet-based network 120 connection rather than using the television service provider's proprietary network. For instance, EPG data may be transmitted to television receivers via the network 120 (e.g., Internet) connection. As another example, firmware and/or software updates may be transmitted on demand to a television receiver via the Internet rather than the television receiver receiving the update via the television programming broadcast network.

The content provider system 102-1 may include one or more adaptable content item 176 repositories and/or particular content item 177 repositories. The content provider system 102-1 may store adaptable content items 176 and/or particular content item 177 in the one or more repositories. The one or more repositories may be implemented in various ways. For example, one or more data processing systems may store adaptable content items. One or more relational or object-oriented databases, or flat files on one or more computers or networked storage devices, may store adaptable content items. In some embodiments, a centralized system stores adaptable content items; alternatively, a distributed/cloud system, network-based system, such as being implemented with a peer-to-peer network, or Internet, may store adaptable content items.

Adaptable content items 176 and/or particularized content items 177 may correspond to any one or combination of raw data, unstructured data, structured data, information, and/or content which may include media content, text, documents, files, instructions, code, executable files, images, video, audio, audio video, and/or any other suitable content suitable for embodiments of the present disclosure. For example, the content items 176 may be adaptable content items that may correspond to visual and/or audiovisual announcements with graphical and/or audio components particularized to certain types of products and/or services. In some embodiments, the announcements may correspond to commercials to be presented during commercial breaks of television programming, such as televised events. In some instances, the content items 176 may be sourced by one or more of the service provider systems 103-1.

In some embodiments, the adaptable content items 176 may correspond to video and/or audio video file structures with one or more transition points, hooks, frames, windows, and/or the like for merging with one or more particularized content items, content items 177, particularized to certain products and/or services. As disclosed herein, the adaptable content items 176 may be merged, blended, joined, overlaid, customized, and/or the like in any suitable manner with other particularized content items 177 in order to create electronic content composites 180 particularized to certain types of products and/or services. In various embodiments, as further disclosed herein, the adaptable content items 176 and/or the other content items 177 may be formatted, rescaled, cropped, image characteristic (e.g., color, brightness, transparency, opaqueness, contrast, etc.) adjusted, and/or otherwise prepared to facilitate the merging, blending, joining, overlaying, customizing, and/or the like and presentation by endpoint media devices 116 as disclosed herein.

In various embodiments, the particularized content items 177 may correspond to content that is particularized to certain types of products and/or services and that, in various embodiments, may be sourced by one or combination of the system 102, one or more of the service provider systems 103-1, and/or the endpoint media device 116 (e.g., in instances where personalization data that may form at least part of a particularized content item 177). In various embodiments, the service provider systems 103-1 may correspond to one or more sources of data and/or services corresponding to the adaptable content items 176 and/or the particularized content items 177, and particularized content items 177 may correspond to the specific data and/or services sourced by a specific service provider system 103-1. For example, the data may correspond to particular digital content that is redeemable to discount product(s) and/or service(s) (i.e., a redeemable content item, such as an ecoupon), matrix code such as a QR code, trailer, movie content, and/or the like. In some embodiments, particularized content items 177 may include personalized content that is particular to one or more viewers. In some embodiments, the personalized content may be separate from the particularized content items 177. As disclosed above, the adaptable content items 176 and/or the content items 177 may correspond to any one or combination of raw data, unstructured data, structured data, information, and/or content which may include media content, text, documents, files, instructions, code, executable files, images, video, audio, audio video, and/or any other suitable content suitable for embodiments of the present disclosure.

In various embodiments, content items 176 and/or 177 may be actively gathered and/or pulled from one or more data sources 112, for example, by accessing a repository and/or by "crawling" various repositories. Additionally or alternatively, the content provider system 102-1 and/or the subsystem(s) 111 may wait for updates from one or a combination of the content source systems 112. Content items 176 and/or 177 pulled and/or pushed from the one or more data sources 112 may be transformed, and the transformed content items 176 and/or 177 and/or other data generated based thereon may be made available by the content provider system 102-1 and/or the subsystem(s) 111 for use by the subsystem(s) 111 in conjunction with content composites 180.

In some embodiments, the content provider system 102-1 may provide the adaptable content items 176 and, in some embodiments, the particularized content items 177, to the endpoint media device 116 as part of a data transfer that is sent through the satellite 106. For example, in some embodiments, the television receiver 116e may receive a downlinked satellite signal that includes the data for adaptable content items 176 and/or particularized content items 177 transferred on a designated line in the vertical blanking interval (VBI) or other portion of the broadcast service transmission that does not interfere with other transmitted content. Additionally or alternatively, the content provider system 102-1 may provide adaptable content items 176 and/or particularized content items 177 to the television receiver 116e via the one or more data networks 120. In some embodiments, the content provider system 102-1 may store the adaptable content items 176 and/or particularized content items 177 in an adaptable content item 176 repository and/or a particularized content items 177 repository included in or otherwise accessible to the content provider system 102-1. In some embodiments, the television receiver 116e may store the adaptable content items 176 and/or particularized content items 177 in an adaptable content item 176 repository and/or a particularized content items 177 repository included in the television receiver 116e or otherwise local to the television receiver 116e. Consequently, the television receiver 116e may use one or more of the adaptable content items 176 and one or more of the particularized content items 177 in accordance with embodiments disclosed herein. In some embodiments, additionally or alternatively to providing the adaptable content items 176 and/or particularized content items 177, the content provider system 102-1 may provide content composites 180 to the television receiver 116e through such means.

The content provider system 102-1 may include a content composite subsystem 111 in whole or in part. In some embodiments, additionally or alternatively, one or more of the endpoint media devices 116 may include a content composite subsystem 111 whole or in part. The extent to which the media devices 116 may be configured to provide features of the subsystem 111 (e.g., by way of software updates and communications from the system 102-1) may depend on the processing power and storage capabilities of a given device 116. The system 102-1 may communicate with a given device 116 to pull specifications and current device capability information from the device 116. Based on such communications, the system 102-1 may the extent to which the device 116 can be configured to provide features of the subsystem 111 and may operate accordingly. For example, the system 102-1 may push one or more software packages to the device 116 to configure the device 116 to provide a set of one or more features of the subsystem 111. In instances where the device 116 lacks sufficient processing and/or storage capabilities, the subsystem 111 may operate on the system 102-1. As one example with respect to many features disclosed herein, the filtering of composites 180 may be performed on the backend at system 102-1 when the device 116 lacks sufficient resources to perform the filtering itself. Further, in some embodiments, additionally or alternatively, one or more service provider systems 103-1 may include a content composite subsystem 111 in whole or in part. The content composite subsystem 111 may be configured to facilitate various content adaptation features in accordance with various embodiments disclosed herein.

The system 102 with the content composite subsystem 111 may be configured to perform one or more methods for facilitating adaptive content items for delivery in a packet stream, such as methods for containerizing and adapting content items, as disclosed herein. In various embodiments, part or all of the method may be performed while an endpoint media device 116 is receiving programming content and/or is outputting programming content for display. In various embodiments, at least part of the method may be performed in advance of the programming content and, thus, may be performed while is scheduled to output programming content but before the programming content is broadcast to endpoint media devices 116 and/or before the programming content output by an endpoint media device 116 for display. In various embodiments, one or more media devices (e.g., the devices 116*a-e* and/or the system 102-1) may perform all or part of the method, with a single media device or multiple media devices performing the method.

In various instances, a media device may receive and process an electronic communication from a user interface, the electronic communication corresponding to an indicator of content. For example, the indicator may correspond to a selection corresponding to a televised event, may correspond to an initialization/powering up of the device 116, a channel and/or stream selection such as a selection to tune to a channel that is streaming the televised event or that is scheduled the stream the event, an application selection such as a selection to download or otherwise stream the televised event which may be by way of an application device, a selection to view and/or record a particular televised event, and/or the like.

The media device may receive first content corresponding to the programming content and may output the content for display with a display device 160 and/or with a display component of a device 116. The first content may be determined to correspond to a televised event as including the televised event, as preceding the televised event, and/or as being delivered within a temporal proximity to the televised event. This may include identifying one or more specifications of the programming content from the programming content; metadata associated with the programming content; EPG or other schedule data received by the device 116 from the content provider system 102-1 and mapping such data to the programming content, channel, and/or current or upcoming time/time period; and/or the like. Some embodiments may further include identifying the programming content as likely be viewed by a particular viewer based at least in part on viewer pattern data, even though the viewer has not yet made a selection to view and/or record the programming content. For example, as disclosed herein, the pattern data may indicate a preference for a particular type of programming content. The subsystem 111 may determine that the programming content corresponds to the preference and that temporal specifications for the programming content satisfy one or more temporal thresholds. In some instances, the subsystem 111 may determine that the programming content is currently ongoing and available for viewing on another channel, stream, or other viewing options that the viewer has not yet selected. Likewise, in some instances, the subsystem 111 may determine that the programming content is scheduled to be available within a suitable time for threshold (e.g., a number of minutes, hours, days, weeks, and/or the like) for viewing on the same channel, stream, or other viewing option that the viewer has selected or on a different channel, stream, or other viewing option that the viewer has not yet selected.

One or more content composites 180 may be created to facilitate delivery of the composite 180 and display of one or more content items 176 (in some instances, as modified with particular items 177) in conjunction with the televised event or other type of audiovisual content (movies, shows, etc.). One or more indicators of one or more state changes with respect to the content (e.g., event that is televised, show, etc.) may be detected. The one or more state changes may include upcoming state changes, such as commercial breaks upcoming within a time threshold (e.g., a number of seconds and/or minutes). In some embodiments, the one or more content composites 180 may be created and/or delivered consequent to the detecting the one or more state changes. In some embodiments, the one or more content items 176 may be adapted with one or more particular items 177 consequent to the detecting the one or more state changes.

In some embodiments, the creating the content composite 180 and/or the adaptation of the one or more content items 176 with one or more particular items 177 may be a function of a current geolocation of the endpoint media device 116, with a set of rules mapped to the current geolocation and specifying geo-specific criteria for creating content composites 180, selecting content items 176 and particularized content items 177, adapting the content items 176 with particularized content items 177, and provisioning the content items 176 and particularized content items 177. The current geolocation of the media device may be determined at a time when the first content is being output for display. With the content composite 180 created and, in some instances, the one or more content items 176 adapted, the one or more content items 176 corresponding to the programming content may be output for display, e.g., during the commercial break, where the content items 176 and particularized content items 177 are selected based at least in part on location metadata mapped to the content items 176 and particularized content items 177 specifying location indicia for the content items 176 and particularized content items 177. Some sets of rules may specify a threshold distance, and the content items 176 and particularized content items 177 may be selected when a distance between the current geolocation of the endpoint media device 116 and the location indicia for the content items 176 and particularized content items 177 satisfies the distance threshold. Some sets of rules may specify that only certain types of particularized content items 177 may be selected when the distance threshold is not satisfied (e.g., promo codes but not ecoupons).

Disclosed embodiments may confirm and verify that a content item 176 (in some instances, as modified with one or more particular content items 177, such as a redeemable content item, matrix code such as a QR code, particularization data, etc.) was transmitted to an endpoint media device 116. Disclosed embodiments may confirm and verify that the modified or unmodified content item 176 was presented with a display device at the endpoint media device 116 (which display device may be integrated with the endpoint media device 116 or otherwise communicatively coupled to the endpoint media device 116). Disclosed embodiments may confirm and verify to what extent the modified or unmodified content item 176 was presented (in full or to a lesser extent). Disclosed embodiments may confirm and verify that the modified or unmodified content item 176 was shown to an intended end user if and when utilizing encryption and/or an encryption flag. Disclosed embodiments may confirm and verify detection of one or more operations executed consequent to the presentation (e.g., scanning a matrix code, loading a redeemable content item and/or another particularized content item 177 into mobile app such as a digital wallet of the endpoint media device 116, utilizing the particularized content items 177 such as to order a product and/or service, etc.) and metrics of the operations (e.g., time of execution). Such confirmations may take the form of return channel notifications from the endpoint device 116 to the system 102, which may contribute to the observation data 229 and feedback loop features disclosed further herein. In addition to such communications from endpoint devices 116, the system 102 may receive pushed and/or pulled notifications from one or more service provider systems 103 that indicate when particularized content items 177 have been used by the endpoint devices 116 with respect to the systems 103 (e.g., to a system 103, uploading at least a portion of a content item 177; communicating at least a portion of a content item 177 such as code, accessing using a URL of a content item 177; transferring, presenting, or otherwise providing an image capture of a content item 177; and/or the like). Such notifications may also contribute to the observation data 229 and feedback loop features.

Figure 3:
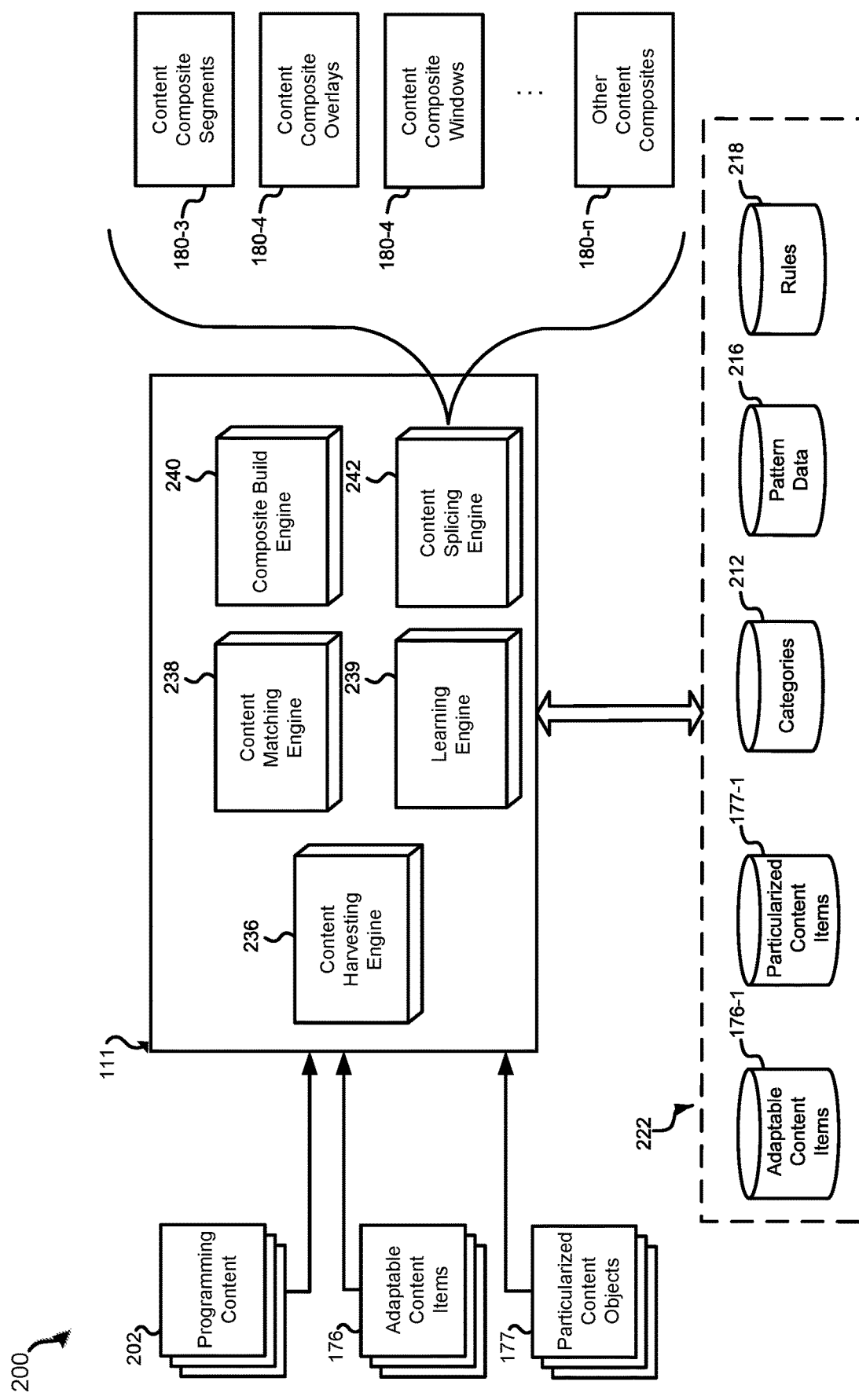
FIG. 3 illustrates a diagram of an adaptive content composite system, in accordance with disclosed embodiments of the present disclosure.

FIG. 3 illustrates a functional diagram of an adaptive content composite system 300, in accordance with disclosed embodiments of the present disclosure. In various embodiments, the content composite system 300 may be included in whole or in part in the content provider system 102-1 and/or an endpoint media device 116. In some embodiments, the content composite system 300 may be separate from, and provide content to, the content provider system 102-1. In some embodiments, the content composite system 300 may be included in the end-user system and may be included in the television receiver 116e and/or one or more of the computing devices 116. In some embodiments, various features of the content composite system 300 may be distributed between the television receiver 116e and upstream of the television receiver 116e. Likewise, in some embodiments, various features of the content composite system 300 may be distributed between one or more of the computing devices 116 and upstream of the one or more computing devices 116. While not all components of the adaptive content composite system 300 are shown, the system 200 may include one or a combination of such components.

As depicted, the content composite system 300 includes a content composite subsystem 111. The content composite subsystem 111 may include or otherwise correspond to an audiovisual control engine that, as with disclosed embodiments of the other engines, may include instructions retained in processor-readable media and to be executed by one or more processors. The content composite subsystem 111 may be communicatively coupled with interface components and communication channels (e.g., of the television receiver 116e and/or the computing device 116, which may take various forms in various embodiments as disclosed herein) configured to receive programming content 202, which may correspond to televised sporting events, movies, television programs, portions thereof, etc. In various embodiments, the programming content 202 may include audiovisual content broadcast and/or otherwise transmitted by the content provider system 102-1 and/or one or more other service providers 103-1. The programming content 202 may include various components, including without limitation, one or more video tracks, audio tracks, audio video tracks, metadata tracks, close captioning information, and/or the like. In some embodiments, the content composite system 300 may retain received programming content 202 in content storage 222. The content storage 222 may include any suitable form of storage media, such as any suitable form disclosed herein.

The content composite subsystem 111 may be further configured to receive adaptable content items 176 and particularized content items 177. The content composite subsystem 111 may include a harvesting engine 236 configured to aggregate adaptable content items 176, particularized content items 177, and/or programming content 202 in order to facilitate content splicing features disclosed herein. The content composite subsystem 111 may include a matching engine 238, which, in various embodiments, may be configured to analyze, classify, categorize, characterize, tag, and/or annotate adaptable content items 176, particularized content items 177, and/or programming content 202.

The content composite subsystem 111 may include a content splicing engine 242. In some embodiments, the content splicing engine 242 may include a multiplexer. In various embodiments, the multiplexer may create a digital stream of data packets containing the video, audio, and, in some embodiments, the metadata to output the programming content 202, adaptable content items 176, and/or the composites 180 created with selected adaptable content items 176. In various embodiments, the content splicing engine 242 may be implemented at the receiver 116e, the device 116, and/or the service provider system 102-1.

In some embodiments where the content splicing engine 242 is implemented at the service provider system 102-1, the multiplexed data stream may be transmitted via the one or more networks 124 for provisioning to computing devices 116 or via a particular transponder stream via a transponder of a satellite four provisioning to receivers 116e. The multiplexer may create a digital stream of data packets containing the video, audio, and entitlement control messages (ECMs), to be transmitted on the transponder data stream. The data stream, which includes video and/or audio data packets that are not scrambled, may be passed to a scrambling engine, which may use a control word to scramble video or audio present in a data packet. Some audio and video packets may also pass through with no scrambling, if desired by the content provider system 102-1. A control word generator may generate the control word that is used by a scrambling engine to scramble the video or audio present in the data packet. Control words generated by the control word generator may be passed to a security system, which may be operated by the television service provider or by a third-party security provider. The control words generated by control word generator may be used by security system to generate an ECM. Each ECM may indicate two control words. The control words indicated may be the current control word being used to scramble video and audio, and the control word that will next be used to scramble video and audio. The security system may output an ECM to the multiplexer for transmission to subscribers' set-top boxes. Each data packet, whether it contains audio, video, an ECM, or some other form of data, may be associated with a particular PID. This PID may be used by the set-top box in combination with a networking information table to determine which television channel the data contained within the data packet corresponds. Accordingly, the transponder data streams may contain scrambled video packet stream and audio packet stream and also an encrypted ECM packet stream which contains the control words necessary to descramble the scrambled video and audio packets.

In some embodiments, the harvesting engine 236 may be configured to receive, pull, process, buffer, organize, rank, and/or store adaptable content items 176, particularized content items 177, and/or programming content 202. In various embodiments, the content provider system 102-1, the television receiver 116e, and/or the computing device 116 may include one or more applications to facilitate the subsystem 111 analyzing and consolidating data feeds and/or event updates received from various data sources 112. As an example, data feeds and/or event updates may include, but are not limited to, updates (real-time and/or otherwise) and/or continuous data streams received from one or more data sources 112, which may include real-time events related to promotions, redeemable content items, special offerings, discounts, sports event information, Twitter® feeds, Instagram® posts, Facebook® updates, Amazon® updates, and/or the like.

As disclosed above, the adaptable content items 176 may be particularized to certain products and/or services. In some embodiments, the adaptable content items 176 may correspond to commercials to be presented during commercial breaks of the programming content 202. In various embodiments, the content items 176 may include audiovisual content broadcast and/or otherwise transmitted by the content provider system 102-1. In some embodiments, adaptable content items 176 may be pushed by the content provider system 102-1 to the subsystem 111. In addition or in alternative, adaptable content items 176 may be pulled by the subsystem 111 (e.g., by the harvesting engine 236) from the content provider system 102-1.

The particularized content items 177 may correspond to content that is particularized to certain types of products and/or services and that is sourced by one or more of the service provider systems 103-1. In various embodiments, the service provider systems 103-1 may correspond to one or more sources of data, products, and/or services corresponding to the adaptable content items 176, and particularized content items 177 may correspond to the specific data and/or services sourced by a specific service provider system 103-1 for one or more specific products and/or services. As disclosed above, the adaptable content items 176 and/or the content items 177 may correspond to any one or combination of raw data, unstructured data, structured data, information, and/or content which may include media content, text, documents, files, instructions, code, executable files, images, video, audio, audio video, and/or any other suitable content suitable for embodiments of the present disclosure.

In various embodiments, sets of one or more adaptable content items 176 and/or sets of one or more content items 177 may be transmitted to the subsystem 111 in batches. For example, sets of one or more adaptable content items 176 and/or sets of one or more content items 177 may be transmitted to the subsystem 111 on a periodic or otherwise scheduled basis. The subsystem 111 may store the adaptable content items 176 locally and, subsequently select one or more of the adaptable content items 176 when needed for presentation during an upcoming break in the programming content 202 and/or when needed for presentation during the programming content 202 based at least in part on the subsystem 111 determining specifications of the programming content 202, a temporal progression in the programming content 202 (e.g., the fourth quarter, the second round, etc.), a state change in the event (e.g., a score change, one team or competitor leading or falling behind, etc.), and/or the like.

In various embodiments, sets of one or more adaptable content items 176 and/or sets of one or more content items 177 may be transmitted to the subsystem 111 on an as-needed basis when the subsystem 111 is receiving programming content 202 corresponding to a certain type (e.g., a televised sporting event), is scheduled to receive such programming content 202, is predicted to receive programming content 202 based at least in part on a detected viewing pattern of past viewing of previous programming content 202 (e.g., of a certain type of event, at certain times, on certain days, etc.), and/or is predicted to receive programming content 202 based at least in part on a detected pattern of past viewer responses to content composites for previous programming content 202 of that type. Additionally or alternatively, in some embodiments, sets of one or more adaptable content items 176 and/or sets of one or more content items 177 may be selected (e.g., the service provider system 102-1) as tailored for particular event viewing habits, ordering patterns, and inferred interests of viewers.

In various embodiments, sets of one or more adaptable content items 176 may be selected (e.g., by the service provider system 102-1) for particular time periods and may be transmitted to the subsystem 111 with an assignment (e.g., by way of tag data or other metadata) for the designated time period. Additionally or alternatively, in some embodiments, sets of one or more adaptable content items 176 may be selected (e.g., by the service provider system 102-1) for particular channels and/or television programs and may be transmitted to the subsystem 111 with an assignment (e.g., by way of tag data or other metadata) for the designated channels, shows, movies, and/or television programs. The transmission of the sets of one or more adaptable content items 176 may be in response to the subsystem 111 pulling the sets of one or more adaptable content items 176 from the service provider system 102-1. For example, the subsystem 111 may pull adaptable content items 176 based at least in part on detecting programming content 202 currently being viewed via a television receiver 116e or computing device 116, detecting programming content 202 scheduled to be viewed or recorded, predicting programming content 202 of interest to a viewer based on detected viewing patterns and/or patterns of interacting with content items 176, 177, determining upcoming programming content 202 based on electronic programming guide information received, and/or the like.

In a similar manner, sets of one or more content items 177 may be pulled from or pushed by one or more service provider systems 103-1, in various embodiments using one or more of the various methods disclosed, to the subsystem 111 directly or indirectly (e.g., by way of the content provider system 102-1, which may then transmit the content items 177 to the subsystem 111) for particular time periods, with assignments for designated channels, shows, movies, and/or television programs. For example, in conjunction with the selection of sets of one or more adaptable content items 176, sets of one or more content items 177 that match the one or more adaptable content items 176 may be pulled from one or more service provider systems 103-1. In various examples, the matching may be based at least in part on specifications of the event, a temporal progression in the event (e.g., the fourth quarter, the second round, etc.), a state change in the event (e.g., a score change, one team or competitor leading or falling behind, etc.), and/or the like.

The subsystem 111 may use the rules 218 to adaptively control content composite creation, the delivery of such content, and interactions with such content. The categorization 212 of the harvested regulations and updated regulations may be used to create various sets of rules 218 governing the creation and provisioning of particularized content composites 180. The various sets of rules 218 may govern the creation and provisioning of particularized content composites 180 as a function of a location of a particular receiver 116e and/or device 116. Hence, different sets of rules 218 may apply to different locations. Further, various sets of rules 218 may provide for various types of restrictions and/or specifications on creating and/or provisioning content composites 180. In addition to geolocation restrictions/specifications, the various types of restrictions and/or specifications may include time restrictions, such as limits on a time of day when content composites 180 may be presented, limits on time in advance particular event (e.g., days, hours, etc.) and/or portion thereof ahead of which content composites 180 may be presented, and the like. Additionally or alternatively, the various types of restrictions and/or specifications may include restrictions on and/or specifications of types of content (e.g., ratings for different audience designations, content designations, etc.) for which content composites 180 may or may not be presented and the manner in which content composites 180 may be presented for the different types of programs and/or viewers (e.g., adult-directed ads may not be presented during children-directed shows and/or to viewers identified as children). Thus, provisioning of content composites 180 may be further differentiated according to show type and/or viewer type, with time, place, and/or manner restrictions/specifications contingent on show type and/or viewer type. Restrictions on and/or specifications of the manner in which content composites 180 may be presented may include differentiating types of devices (e.g., smart phone versus laptop computer, laptop computer versus television receiver, etc.) which will display the content composites 180.

To facilitate geo-discrimination to differentiate which sets of rules 218 apply to a given content provisioning instance with respect to a program and which content items 176, 177 to select and present as a function of the current device 116 location, disclosed embodiments may provide for capturing and analyzing location data 179 for the device 116 to determine a current location of the device 116. The current location of the device 116 may also be used to identify, by a system 102, 103 and/or an application of the device 116, when a content item 177 stored by the device 116 (e.g., in a digital wallet) is applicable based at least in part on location metadata of the content item 177 that specifies a product/service provider location that is within a threshold distance from the current location. The threshold distance may be specified by the location metadata, user preferences, application settings, and/or the system 102, 103. In instances where the threshold is satisfied, one or more push notifications may be transmitted from one of the systems 102, 103 to the endpoint media device 116; the application of the endpoint media device 116 may be invoked, awakened, opened, otherwise activated; and/or the application may pop up a notification on a display of the endpoint media device 116 to alert the user to the content item 177 and the proximate provider location.

Location data 179 may also be captured to facilitate geo-sensitive adaptive content splicing adaptive content splicing with respect to content 202 corresponding to a televised event as a function of a location detected for the device 116 that receives the content and is to cause display of content composites 180 in conjunction with the content. In various embodiments, the matching engine 238 may include a location correlation engine that may correlate location data 179 to a set of one or more zip codes (or other postal codes) and a corresponding rule set identifier for a set of one or more rules 218 mapped to the set of one or more zip codes (or other postal codes) via identifiers keyed with one or more tables and/or indexes.

In various embodiments, location data may be determined by television receivers 116e and/or devices 116, and such data may be sent to the system 102-1. The television receivers 116e and/or devices 116 may, in some embodiments, have location detection capabilities based at least in part on location data provided by way of device GPS capabilities, Wi-Fi, cellular, other access points, subscriber/account information, and/or the like techniques for determining a current location of the respective receiver 116e and/or device 116, and corresponding location data 179 may be transmitted to the system 102-1. In some embodiments, the system 102-1 may gather the location data 179. In some embodiments, where the location data 179 does not explicitly indicate a geolocation, the system 102-1 may determine geo-locations by cross-referencing subscriber/account identifiers with stored geolocation data associated with subscribers/accounts.

Additionally, in some embodiments, the receiver 116e and/or device 116 may be capable of communicating with a Global Positioning System (GPS) in order to determine to location of the respective receiver 116e and/or device 116. The antenna may be a GPS receiver or otherwise include a GPS receiver. In various embodiments, communication with the receiver 116e and/or device 116 may be conducted with a single antenna configured for multiple purposes (e.g., cellular, transactions, GPS, etc.), or with further interfaces (e.g., three, four, or more separate interfaces). In some embodiments, an application installed on the receiver 116e and/or device 116 may cooperate with the system 102-1 to facilitate tracking of locations of the receiver 116e and/or device 116. For example, the receiver 116e and/or device 116 may transmit location data 179 to any suitable backend system component. The location data 179 may be a combination of data based on one or a combination of GPS, Wi-Fi, cellular, device sensor(s) such as a barometric sensor or accelerometer, RFID device signals, and/or other techniques for determining a current location of the receiver 116e and/or device 116.

The receiver 116e and/or device 116 may access the one or more networks 120 through one or more wireless links to one or more access points. The access points may be of any suitable type or types. For example, an access point may be a cellular base station, an access point for wireless local area network (e.g., a Wi-Fi access point), an access point for wireless personal area network (e.g., a Bluetooth access point), etc. The access point may connect the receiver 116e and/or device 116 to the one or more networks 120, which may include the Internet, an intranet, a local area network, a public switched telephone network (PSTN), private communication networks, etc. In some embodiments, access point(s) may be used in obtaining location data 179 for the receiver 116e and/or device 116.

Figure 4:
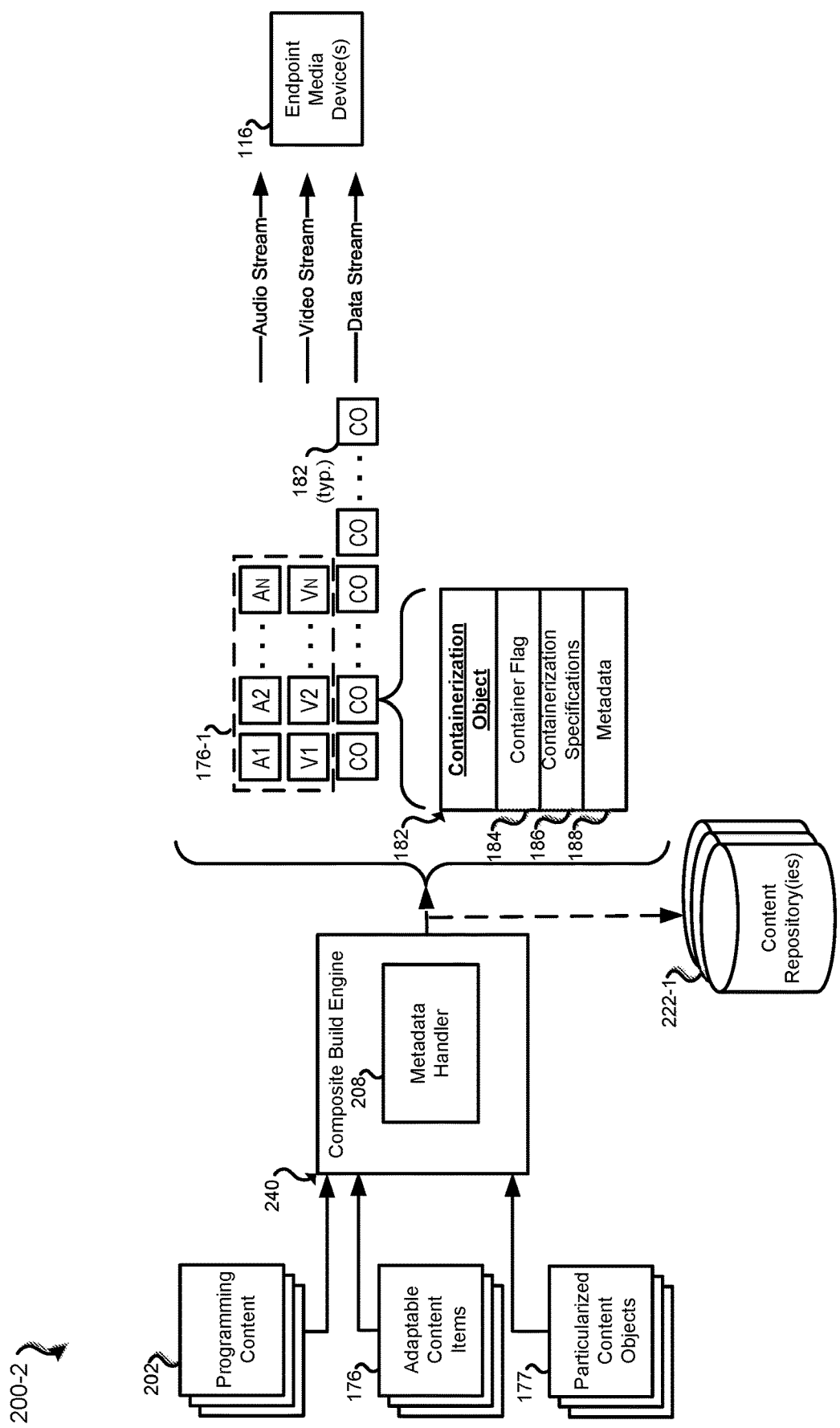
FIG. 4 illustrates a composite build engine, in accordance with disclosed embodiments of the present disclosure.

FIG. 4 is a simplified illustration of a composite build engine 240, in accordance with disclosed embodiments of the present disclosure. In various embodiments, the composite build engine 240 may be included in the subsystem 111 or may be separate from the subsystem 111. The composite build engine 240 may, in some embodiments, be included in the content provider system 102-1. Having processed an adaptable content item 176, the subsystem 111 may create one or more content composites 180 that may include the adaptable content item 176.

To create the content composites 180, disclosed embodiments may provide the content item 176 with containerization objects 182 that each containerize a set of data as a persistent object in time. Each containerization object 182 may be configured to function in a broadcast environment while facilitating the various features disclosed herein. For example, among other things, the containerization object 182 may create the ability for the disclosed deeper integration with endpoint devices 116 in a broadcast environment. With the containerization object 182, the content composites 180 may allow the content item 176 to be treated as an object wrapped with an identity and with one or more layers of encryption. As disclosed herein, the one or more layers of encryption provided with various embodiments may correspond to encryption at one or more software layers, as distinguishable from hardware encryption of a device 116. The various embodiments of one or more layers of encryption may allow for encryption of one or a combination of return channel communications, data regarding endpoint device 116 operations that contribute to observation data 229, content items 176, content items 177, composites 180, and/or components thereof, which may particularly include encryption of personalization and transactional data, which may provide for DRM, and which may ensure end user privacy.

The composite build engine 240 may configure the containerization object 182 to include a container flag 184. The container flag 184 may include one or more parameters that indicate one or more containerization specifications 186. The container flag 184 may be thin and may indicate other components packetized in the containerization object 182. For example, in various embodiments, container flag 184 may include indicia of one or a combination of: an identifier of the content item 176 in the container, boundaries of the set of one or more audio and/or video packets that form the content item 176, access and reference to one or more other containerization specifications 186, access and reference to other metadata 188, and/or the like. The content item identifier may correspond to a field with parameters that identifies the content item 176.

Further, the composite build engine 240 may configure the containerization object 182 to include the containerization specifications 186 to facilitate performance of a set of one or more operations by the one or more endpoint media devices 116 with respect to the content item 176 consequent to the one or more endpoint devices 116 receiving the content composite 180. In various embodiments, the containerization specifications 186 may include one or a combination of instructions, metadata, personalization content or instructions to fetch personalization content, and/or the like to specify and facilitate performance of the set of one or more operations by an endpoint media device 116. In some embodiments, the containerization specifications 186 may include a particularized content item 177 or instructions to fetch a particularized content item 177.

Accordingly, the content composite 180 may include the content item 176 and the containerization object 182. Further, in various embodiments, the content composite 180 may include a particularized content item 177 at the time the content composite 180 is transmitted to one or more endpoint media devices 116, separate from or grafted into the content item 176 such that the content item 176 is an adapted content item 176 adapted with the particularized content item 177. In some embodiments, the content composite 180 may not include a particularized content item 177 at the time the content composite 180 is transmitted to one or more endpoint media devices 116. In such instances, the particularized content item 177 may be fetched per the containerization specifications 186 from the system 102, 200, another data source 103, or from storage of the endpoint media device 116, and may be used by an endpoint media device 116 to adapt the content item 176. The containerization specifications 186 may include instructions and build specifications according to which the endpoint media device 116 may merge the pulled/retrieved particularized content item 177 with the content item 176. As part of the instructions and build specifications, the containerization specifications 186 may specify that the particularized content item 177 (e.g., a particular redeemable content item, matrix code such as a QR code, trailer, movie content, and/or the like) contain one or more date and/or time attributes (e.g., a time stamp) indicate of one or a combination of when the item was created, when the item is to be output by the endpoint media device 116 for display, when the item is stored by the endpoint media device 116 (e.g., in a digital wallet), and/or the like. In some embodiments, the one or more date and/or time attributes may be stored with the metadata 188.

In various embodiments, the content composite 180 may further include personalization content personalized to the end user of the endpoint media device 116 at the time the content composite 180 is transmitted to one or more endpoint media devices 116, separate from or grafted into the content item 176 such that the content item 176 is an adapted content item 176 adapted with the personalization content. In some embodiments, the content composite 180 may not include personalization content at the time the content composite 180 is transmitted to one or more endpoint media devices 116. In such instances, the personalization content may be fetched per the containerization specifications 186 from the system 102, 200, another data source 103, or from storage of the endpoint media device 116, and may be used by an endpoint media device 116 to adapt the content item 176 according to instructions and build specifications of the containerization specifications 186.

The subsystem 111 may transmit the content composite 180 to one or more endpoint media devices 116, and, in some embodiments, may broadcast the content composite 180 to a plurality of endpoint media devices 116. The subsystem 111 may transmit the content composite 180 in accordance with composite transmission specifications. The composite transmission specifications may at least partially specify transmission parameters that govern transmission of the containerization object 182 in a data stream with the set of one or more audio and/or video packets in audio and/or video streams corresponding to the content item 176.

The content item 176 may correspond to a specific unit within the content stream. The specific unit in the content stream may correspond to a section of the video stream that includes the set of one or more audio and/or video packets for the content item 176. The composite transmission specifications may specify how the containerization object 182 should be transmitted in the data stream with the content item 176, how many instances of the containerization object 182 should be created and transmitted, how should some instances of the containerization object 182 be time/place shifted in advance of the packets corresponding to the content item 176, and/or the like. Thus, the composite transmission specifications may provide for one or more instances of the containerization object 182 particularized for the individual content item 176 to be transmitted within the data stream of the content stream, with the content item 176 transmitted in the audio and/or video stream(s). Accordingly, a number of instances of the containerization object 182 with the content item identifier, as specified by the composite transmission specifications, may be embedded in a section of the data stream that indicates the content item 176. Not only may the containerization object 182 with the container flag 184 be carried as a data stream with the audiovideo content stream, flagging the content item 176, it may also be replicated and encoded in a carousel manner per the composite transmission specifications to facilitate pick-up mid-stream of the content item 176, and/or in advance of the content item 176 in the stream to facilitate forward identification of the upcoming content item 176.

The container flag 184 and its indicia may be encrypted and transmitted to the endpoint media device(s) 116 in the encrypted state with the content composite 180. Additionally or alternatively, the containerization specifications 186 may be encrypted and transmitted to the endpoint media device(s) 116 in the encrypted state with the content composite 180. Accordingly, disclosed embodiments may add an encrypted container flag 184 to the content item 176.

In various embodiments, the encrypted container flag 184 may govern access by the endpoint media device 116 to one or more other components of the content composite 180. Consequent to delivery of the content composite 180 to the endpoint media device 116, the endpoint media device 116 may decrypt the encrypted container flag 184. Once the endpoint media device 116 decrypts the container flag 184, the endpoint media device 116 may have access to, for example, the metadata of the content composite 180, such as the instructions of the containerization specifications 186, other containerization specifications 186, and/or the other metadata 188.

The container flag 184 may include indicia that identifies the state and extent of one or more layers of encryption of the content composite 180. One or more of the components of the content composite 180 may be encrypted. The encryption may include a lightweight, point-to-point encryption for specific components of the content composite 180, which may be advantageous to avoid bogging down processing in view of relatively heavier processing needs for video of content items 176 and generally shorter durations of content items 176.

The indicia may flag one or more objects and/or containers for the specific unit(s) within the content stream without the entire data stream being encrypted. The subsystem 111 may all or part of content composite 180 contingent on the extent of the personalization of the content composite 180. For example, when the content composite 180 is transmitted with personalization content, the personalization content may be encrypted. As one example out of many possibilities, when a content item 176 is adapted with a list of items to acquire prepared for an identified viewer, at least the portion of data corresponding to the list may be encrypted, whereas the balance of the content item 176 that is not personalized may not encrypted. Accordingly, a partially customized content composite 180 and/or content item 176 may only be partially encrypted. However, a highly customized content composite 180 and/or content item 176 may be entirely or substantially entirely encrypted, commensurate with the extent of the customization for the identified viewer. For example, if the content item 176 is due to an identified viewer selection (say, a prior procurement, such as the viewer having obtained access permissions to a movie or other particular content), then, after scraping an ID that a viewer has allowed such, the content composite 180 and/or content item 176 (which, for example, may be directed to opening up 1-to-1 connection to access a digital ticket, access to a digital copy of the content, bonus content, a content item that requires tracking such as a redeemable content item for a pay-per-view, etc.) may be entirely or substantially entirely encrypted. Such content may be highly customized and may include watermarking. One or more particularized content items 177, for example, may include watermarks for merging with content items 176 as disclosed herein.

The content composites 180 may provide for advantages with greater layers within a content stream more based around computer language. In some embodiments, various options for content items 176 may be broadcasted, with only a subset of the content items 176 being presented by particular endpoint media devices 116. The indicia of the container flags 184 of the content composites 180 may allow for filtering the content composites 180 according to attributes of the endpoint media device 116 and/or the endpoint viewer so the matching composite 180 is presented to the identified viewer/viewer type, pursuant to the differentiated interaction with mobile app, etc. For example, flag indicia may include layer flag indicia that indicates this content item is for unlocked devices or only locked devices. One layer may allow for identifying different types of the content media devices 116 that differ in capabilities, which, in some embodiments, may be determining based at least in part on pulling information (e.g., device specifications) from the particular endpoint media device 116. Such device type identification may further allow for selectively providing a type of endpoint media device 116 with different types of content items 176 and different content attributes as a function of the device type. For example, such selective provisioning may include filtering content items 176 based at least in part on the differences in frame rate of the content items 176 as a function of the endpoint media device type and/or capabilities. Different content items 176 may be filtered for different endpoint media device 116 (e.g., content items 176 with frame rates associated with fast-changing content may not be mapped to devices with lesser capabilities). As another example, such selective provisioning may include filtering content items 176 based at least in part on the differences in how the content items 176 are compressed as a function of the endpoint media device type and/or capabilities.

One layer may allow for determining endpoint media device 116 authentication. The endpoint media device 116 authentication may be dependent on discovery processes that the determine what is on the device that can be used to sufficiently authenticate the endpoint media device 116. For example, the discovery processes may determine and utilize a SIM card of a mobile device, television receiver with a smartcard, and/or similar identification that can be used to authenticate to set up account. Having determined that the endpoint media device 116 and/or the endpoint has potential to have an account, another layer may allow for search and authentication operations to try to find an account associated with the endpoint media device 116 and/or the endpoint and then authenticate against services related as part of a subscriber account.

Another layer may allow for filtering one or a combination of the content composite 180, the content item 176, the particularized content item 177, and/or the personalization content based at least in part on the authentication and identification of the endpoint viewer. For example, such filtering may include selecting and presenting the content composite 180, the content item 176, the particularized content item 177, and/or the personalization content that correspond to one or more demographics of the identified viewer (e.g., age, marital status, children, pets, renter, homeowner, etc.) and/or viewer type (e.g., flag indicia of NC-17, MA, or another rating so an endpoint device with parental specifications would be provided with appropriate content items). As another example, such filtering may include selecting and presenting the content composite 180, the content item 176, the particularized content item 177, and/or the personalization content that correspond to identified past actions mapped to the endpoint and/or endpoint media device 116. This can result in such differences as presenting content that is directed to, say, "get video subscription service X" versus "because you have video subscription service X, . . . Y." Another layer may allow for creating a backchannel to facilitate communications, ordering, secure video delivery, and/or the like disclosed herein.

In some embodiments, the container flag 184 and/or containerization specifications 186 may prompt the endpoint media device 116 to execute the instructions to perform at least one operation of the set of one or more operations facilitated by the containerization object 182. In some embodiments, APIs may be used to instruct the endpoint media device 116 as to what to do with the container flag 184 and/or containerization specifications 186. In some embodiments, the container flag 184 and/or containerization specifications 186 may allow for invoking, waking up, opening, and/or otherwise activating an application of the endpoint media device 116 responsive to the decryption of the container flag 184 and/or containerization specifications 186, in some instances, when the application is offline and/or otherwise not online with respect to the system 102, 200, and/or another system 103.

For example, the container flag 184 and/or containerization specifications 186 may include a read flag that triggers one or more return channel communications. The corresponding instructions may instruct the endpoint media device 116 to report to the system 102, 200, and/or another system 103 with one or more return channel communications one or a combination of: that the content item 176 was received by the endpoint media device 116; that the content item 176 was presented with a display device at the endpoint media device 116; to what extent the content item 176 was presented (in full or to what lesser extent in percentage or another suitable metric); that the content item 176 was shown to an intended endpoint user, detection of one or more operations executed consequent to the presentation (e.g., scanning a matrix code, loading a redeemable content item and/or particularization content into a mobile app such as a digital wallet of the endpoint media device 116, utilizing the particular content items 177 such as to order a product and/or service, etc.) and metrics of the operations (e.g., time of execution); and/or the like. Further, the return channel communications may include one or a combination of: indicia of a particular endpoint user and/or type of endpoint user using the endpoint media device 116 within a time period before and/or when at least part of a content item 176 is/was output for display; indicia of endpoint media device 116 capabilities (e.g., device specifications); indicia of authentication bases such as a SIM card of a mobile device, television receiver with a smartcard, and/or similar identification that can be used to authenticate to set up account; and/or the like.

The return channel communications may contribute to the observation data 229 and feedback loop features disclosed further herein. The containerization specifications 186 may instruct the endpoint media device 116 to report back upon occurrence of each state change and/or to report back per a reporting schedule (e.g., just prior to closure of an application, at end of day, at the end of another reporting period, etc.). In various embodiments, the container flag 184 and/or containerization specifications 186 may include one or more encrypted messages, hashes, and/or the like that each indicate one or more of the above reporting events. Accordingly, the instructions may specify that each return channel notification include a corresponding encrypted message, hash, code, and/or the like, which the system 102, 200, and/or another system 103 may process to verify the respective reporting event and metrics thereof.

In instances where the system 102 may receive pushed and/or pulled notifications from one or more service provider systems 103 that indicate when particularized content items 177 have been used by the endpoint devices 116 with respect to the systems 103 (e.g., to a system 103, uploading at least a portion of a content item 177; communicating at least a portion of a content item 177 such as code, accessing using a URL of a content item 177; transferring, presenting, or otherwise providing an image capture of a content item 177; and/or the like), the notifications may contain indicia of one or a combination of the content item 177, the endpoint device 116, the user associated with the endpoint device 116, a location associated with the use of the content item 177, date and/or time associated with the use of the content item 177, and/or the like. Having received such indicia from a service provider system 103, the subsystem 111 (e.g., the matching engine 238) may correlate the indicia to records stored in a database 222 with identifiers of one or a combination of the content item 177, the endpoint device 116, the user and/or account associated with the endpoint device 116, a location associated with the user, account, and/or endpoint device 116, and/or date and/or time associated with the delivery and/or presentation of the content item 177. The identified correlations may contribute to the observation data 229 and feedback loop features.

In some embodiments, where the content item 176 is not already adapted with the particularized content item 177, the set of one or more operations may include identifying the particularized content item 177 and adapting the content item 176 with the particularized content item 177. When the particularized content item 177 is not included in the content composite 180 when the content composite 180 is received by the endpoint media device 116, the set of one or more operations may include pulling the particularized content item 177 from the system 102, 200, another data source 103 per the containerization specifications 186. In some embodiments, the particularized content item(s) 177 may be transmitted separately from the system 102, 200 and/or another data source 103 prior to the delivery of the content composite 180 such that the endpoint media device 116 stores the particularized content item(s) 177 locally. In such instances, the set of one or more operations may include retrieving the matching particularized content item 177 from storage of the endpoint media device 116 per the containerization specifications 186. Further, in some embodiments, when the particularized content item 177 is not transmitted with the content item 176, the containerization specifications 186 may specify first checking local storage of the endpoint media device 116 for the matching particularized content item 177 and only pulling the particularized content item 177 from the system 102, 200 and/or another data source 103 when the particularized content item 177 is not available from the local storage.

Similarly, the set of one or more operations may include identifying the personalized content that is particular to one or more viewers and adapting the content item 176 with the personalized content. As disclosed herein, in some embodiments, the particularized content item 177 may include personalized content. In such instances, the adapting of the content item 176 with the particularized content item 177 may include adapting of the content item 176 with personalized content. Additionally or alternatively, personalized content may be separate from the particularized content item 177. Hence, where the content item 176 is not already adapted with the personalized content, the personalized content may be included in the content composite 180 when the content composite 180 is received by the endpoint media device 116. When the personalized content is not included in the content composite 180 when the content composite 180 is received by the endpoint media device 116, the set of one or more operations may include retrieving/pulling the personalized content from one or a combination of local storage of the endpoint media device 116, the system 102, 200, and/or another data source 103 per the containerization specifications 186. The containerization specifications 186 may specify first checking local storage of the endpoint media device 116 for the matching personalized content and then pulling the personalized content from the system 102, 200 and/or another data source 103 when at least some of the personalized content is not available (or when sufficient personalized content of one or more specified types is not available) from the local storage or when supplemental personalized content is identified as requested per the containerization specifications 186.

To facilitate the content composite 180, the composite build engine 240 may include a metadata handler 208 that may generate metadata (e.g., one or more tags) corresponding to identifiers, attributes, characteristics, and/or categories of programming content 202, adaptable content items 176, and/or particularized content items 177. In some embodiments, the composite build engine 240 may assign packet identifiers to identify data of the content that is to be transmitted as part of a data stream to an endpoint media device 116 and that is to be associated with one or more tags. Data transmitted as part of a data stream to an endpoint media device 116 may be packetized and assigned packet identifiers. A particular packet identifier may be associated with data packets related to tags for particular segments of programming content 202, adaptable content items 176, and/or particularized content items 177.

The content matching engine 238 may identify a televised event in the programming content 202 and may identify one or more corresponding identifiers, attributes, characteristics, and/or categories of programming content 202, adaptable content items 176, and/or particularized content items 177 of one or more adaptable content items 176 and/or one or more particularized content items 177. Based at least in part on such identification, the composite build engine 240 may create metadata, which, in some embodiments, may correspond to tag data.

Tag data may include an indication of a period of time (or other measure of time, e.g., a number of frames), a start frame, an end frame, and/or the like. Tag data may include or otherwise be associated with a tag identifier and may include event, attribute, characteristic, and/or category identifiers. For example, the metadata for the televised event may identify the particular event. The metadata may further identify one or more attributes of the particular event (e.g., any suitable identifier for the participating entities, the location of an event, and/or the like). In some embodiments, at least a portion of the metadata augmentation may be performed at the content provider system 102-1 such that one or more tagged composite components may be is provided to an endpoint media device 116. Subsequently, the endpoint media device 116 may identify composite components, for example, by processing the metadata.

The metadata for adaptable content items 176 may, for example, identify the adaptable content items 176 as being adaptable with any suitable identifier, such as a flag, field value, etc. Additionally or alternatively, the metadata for the adaptable content items 176 may identify that the adaptable content items 176 are designated for a certain event or category of events with any suitable identifier. The metadata for the adaptable content items 176 may further identify one or more attributes of the particular event (e.g., any suitable identifier for associated entities, location, a temporal attribute such as a time of an event, and/or the like). Additionally or alternatively, the metadata for the adaptable content items 176 may identify transition points, hooks, frames, windows, other portions designated for overlays, and/or the like for merging with content items 177 such that content from the content items 177 is merged at the transition points, hooks, frames, windows, other portions designated for overlays, and/or the like.

In some embodiments, metadata-augmented adaptable content items 176 may be provided by the service provider system 102-1 to the endpoint media devices 116, after which the endpoint media devices 116, each having at least a portion of the content composite subsystems 111, may process and use the metadata to facilitate matching adaptable content items 176 with corresponding programming content 202. Likewise, the endpoint media devices 116 may process and use the metadata to facilitate matching adaptable content items 176 with corresponding content items 177. Thus, the metadata may facilitate the endpoint media devices 116 appropriately providing corresponding content composites 180 for display with appropriate placement with respect to televised events, shows, etc. at commercial breaks and/or during presentation of the televised events, shows, etc.

In a similar manner, metadata for particularized content items 177 may, for example, identify an identifier of the particular event, show, etc. The metadata for the content items 177 may further identify fields and content for one or more attributes, such as URLs and hyperlinks to platforms and websites and/or sites for further information, ordering, and/or the like. In some embodiments, at least a portion of the metadata augmentation may be performed at the service provider system 102-1 and/or the service provider system 103-1 with respect to the particularized content items 177. Subsequently, the content composite subsystem(s) 111 and/or endpoint media devices 116 may process and use the metadata to facilitate matching adaptable content items 176 with corresponding content items 177. In some embodiments, the devices 116, having at least a portion of the content composite subsystem 111, may process the particularized content items 177 in the form in which they are received (e.g., directly from a service provider 103-1) and, based on such processing, may match content items 176 with corresponding content items 177.

Referring again more particularly to FIG. 3, the matching engine 238 may be configured to match adaptable content items 176 to segments of programming content 202 based at least in part on metadata at a service provider system 102-1 side or at a device 116, in accordance with various embodiments. For example, metadata may be extracted when or before a given segment of programming content 202 is to be output for display and before a transition point. In some embodiments, the matching engine 238 may read the metadata mapped to the segment and perform a search of the repositories 222 for one or more adaptable content items 176 that have metadata matching the extracted metadata with respect to one or more of event identification, event category identification, and/or temporal identification, with the highest preference given to the adaptable content item 176 that has metadata most closely matching the metadata of the previous segment. Alternatively, the matching engine 238 may read the metadata mapped to the segment and pull one or more adaptable content items 176 from the service provider system 102-1. In so doing, the subsystem 111 may transmit at least a portion of the metadata of the programming content 202 to the service provider system 102-1 in order to facilitate matching the extracted metadata with one or more adaptable content items 176 with respect to one or more of event identification, event category identification, and/or temporal identification. Some embodiments may include the subsystem 111 configured to perform a search of the repositories 222 for one or more adaptable content items 176 that have metadata matching the extracted metadata in addition to pulling one or more adaptable content items 176 from the service provider system 102-1. For example, the subsystem 111 may first perform a search of the repositories 222 for any matching adaptable content items 176 and then only pull one or more adaptable content items 176 from the service provider system 102-1 when no adaptable content items 176 are found in the search of the repositories 222 that match the extracted metadata with a sufficient match score that indicates a level of correlation satisfying a correlation threshold. Accordingly, certain embodiments may facilitate matching of adaptable content items 176 to segments of programming content 202 based at least in part on metadata.

In a similar manner, the matching engine 238 may be configured to match particularized content items 177 to one or more of content items 176, segments of programming content 202, and/or provider systems 103 at a service provider system 102-1 side or at a device 116, in accordance with various embodiments. For example, in some embodiments, the matching of one or more particularized content items 177 may be based at least in part on metadata. The metadata may be extracted and read when or before a given content item 176 and/or a given segment of programming content 202-1 is to be output for display, and, before a transition point, may be mapped to the content item 176 or the segment. In some embodiments, the matching of one or more particularized content items 177 may be based at least in part on identified characteristics of a given content item 176 and/or a given segment of programming content 202. The matching engine 238 may take the identified characteristics of a given content item 176 and/or a given segment of programming content 202 as cues to retrieve one or more content items 177 and/or one or more corresponding adaptable content items 176 and for the content splicing engine 242 to output one or more content composites 180 for presentation. The timing of the presentation may be after the segment of programming content 202 (e.g., at a commercial break), during the segment of programming content 202 (e.g., as an overlay, in a side window/frame, etc.) to match the identified characteristics of the programming content 202, or after the presentation of a first composite 180 (e.g., when one or more content items 177 and/or one or more corresponding adaptable content items 176 are selected for presentation as a subsequent composite 180 or for separate provisioning to the device 116 in accordance with various embodiments disclosed herein such as transferring to an account accessible by a user of the endpoint media device 116).

In various embodiments, the characteristic identification may include one or a combination of text recognition, image recognition, and/or audio recognition. For example, the matching engine 238 may recognize text from the metadata of content items 176 and/or programming content 202. As some possible examples out of many possibilities, the matching engine 238 may recognize indicia of uniform resource identifiers (e.g., URLs), identifiers of provider systems 103, and/or the like from the metadata (which may include closed captioning information) that the matching engine 238 may map to provider systems 103. To facilitate image recognition, some embodiments of the content composite subsystem 111 (e.g., by way of the matching engine 238) may be configured to detect one or more color characteristics in content items 176 and/or programming content 202, which may include any suitable color characteristic that may be measured to recognize alpha and/or numerical portions of the images and/or objects in the images. From such portions and/or objects, the matching engine 238 may recognize uniform resource identifiers (e.g., URLs, web addresses, etc.), phone numbers, identifiers of provider systems 103, logos, products, graphics displayed with streaming tickers or overlays typically positioned and/or scrolling across a portion of the display area, and/or the like which the matching engine 238 may map to provider systems 103. The matching engine 238 may include an image analyzer and handling module to facilitate that detection. By way of example, the matching engine 238 may detect one or more color characteristics in programming content 202 by way of any one or combination of pixel identification, detecting color component values, detecting color codes, and/or the like.

To facilitate audio recognition, the content composite subsystem 111 (e.g., by way of the matching engine 238) may be configured to detect one or more audio characteristics in content items 176 and/or programming content 202. The matching engine 238 may include an audio analyzer and handling module to facilitate that detection. By way of example, the matching engine 238 may detect one or more audio characteristics in content items 176 and/or programming content 202 by way of any one or combination of analyzing audio, applying voice recognition, acoustic spectrum analysis, analyzing the audio tracks metadata track, comparison to acoustic profiles for types of content, and/or the like. Some embodiments of the content composite subsystem 111 may store acoustic profiles mapped to types of content items 176 and/or programming content 202 and corresponding provider systems 103 in the repository 222. Each acoustic profile may specify one or more selected values of acoustic metrics as distinctive markings and/or acoustic categories 214 (e.g., songs, musical scores, jingles, voice characteristics, and/or the like) as characteristics of the types of content items 176 and/or programming content 202 and corresponding provider systems 103.

As another example, the subsystem 111 may recognize one or more keywords from dialogue that the matching engine 238 may map to provider systems 103. The matching engine 238 may identify one or more keywords and/or expressions in the dialogue as a dialogue impression for the purposes of characterizing the sample and identifying content items 176 and/or programming content 202 and corresponding provider systems 103. The matching engine 238 may compile the keywords and/or expressions of the sample and retain the keywords and/or expressions and corresponding provider systems 103 in the dialogue impression. In some cases, the matching engine 238 may correlate the dialogue impression to one or more dialogue categories 212 for similar dialogue impressions and corresponding provider systems 103. In various embodiments, the correlation may be based at least in part on matching selected keywords and/or expressions to identical and/or similar keywords and/or expressions specified for certain dialogue categories 212 and corresponding provider systems 103. The dialogue categories 212 may include categorizations of concept, keyword, expression, and/or the like mapped to corresponding provider systems 103. Based at least in part on the dialogue impression, the matching engine 238 may create a dialogue profile for content items 176 and/or programming content 202 and corresponding provider systems 103. The dialogue profile may be retained in any suitable form, such as a file, a list, etc. The content composite subsystem 111 may store dialogue profiles mapped to content items 176 and/or programming content 202 and corresponding provider systems 103 in the repository 222. Each dialogue profile may specify one or more selected keywords and/or expressions as distinctive markings and/or dialogue categories 212 as characteristics of the content items 176 and/or programming content 202 and corresponding provider systems 103.

To facilitated the matching, the matching engine 238 may perform correlation based at least in part on the text recognition, image recognition, and/or audio recognition and text, image, and/or audio categories 212. By way of example, the correlation rules 218 may include correlation criteria that could include keywords identified by any one or combination of words, word stems, phrase, word groupings, and/or like keyword information. The correlation criteria could include weightings assigned to dialogue specifications. Hence, within each dialogue bucket, a keyword could be assigned a weight according to its significance. More significant keywords could be assigned a greater weight than stop words. Such buckets could be implemented in any suitable manner, including lists, tables, matrices, and/or the like. And within a bucket, characteristics and/or keywords could be organized in a rank order and/or any hierarchical structure according to weight. Some embodiments may have characteristics and/or keywords organized according to decision tree, with contingencies so that only certain combinations of characteristics and/or keywords may be considered. For example, certain characteristics and/or keywords could only have significance if used in conjunction with other characteristics and/or keywords, and/or not in conjunction with others. Similar correlation criteria may be used for acoustic impressions.

In some embodiments, the matching engine 238 may employ a scoring system to quantify correlations with a numerical expression, for example, a match score, with higher scores being assigned to higher correlations. Higher scores may be assigned for greater extents of matching. By way of example with respect to dialogue, a match of three dialogue cues or dialogue categories may be assigned a higher score than a match of only one top dialogue cue and/or dialogue category. As another example, an exact match of words, expressions, and/or dialogue categories may be assigned a higher score than a complimentary match (e.g., where absent an exact match, a word, expression, and/or dialogue category is defined as a complement to another a word, expression, and/or dialogue category).

Some embodiments may sample only portions of content items 176 and/or programming content 202 to derive the characteristics of the content items 176 and/or programming content 202. For example, the sampling may be relegated to only the last X seconds of audio and/or video of a content item 176. As another example, the sampling may be relegated to only I-frames of a content item 176. Accordingly, the sampling may facilitate composite 180 creation and presentation so that the composite 180 may be dynamically inserted in the content stream or otherwise provisioned within a short time and with minimized processing resources.

In some embodiments, with a system 103 identified based at least in part on identified the metadata and/or characteristics, the matching engine 238 may and perform a search of the repositories 222 for one or more content items 177 that have metadata that maps to provider systems 103. In such cases where the repositories 222 are searched for one or more content items 177, the one or more content items 177 may have been previously transmitted to the subsystem 111 directly from one or more service provider systems 103-1 or indirectly from one or more service provider systems 103-1 by way of the service provider system 102-1. Such content items 177 may include temporal identification indicating a time for which content corresponding to the content item 177 remains in effect. For example, each content item 177 may comprise content for which an expiration is specified (e.g., with one or more of time, date, duration, etc.). Accordingly, the matching engine 238 may perform a staleness check by examining the metadata of any such content items 177 retrieved from the repositories 222 to determine whether the content items 177 have expired with respect to the current time and date.

Additionally or alternatively, the subsystem 111 may pull one or more content items 177 from the service provider system 102-1 and/or one or more service provider systems 103-1. In so doing, the subsystem 111 may transmit at least a portion of the metadata of the programming content 202 to the service provider system 102-1 and/or one or more service provider systems 103-1 in order to facilitate matching the extracted metadata with one or more content items 177 with respect to one or more of event identification, event category identification, and/or temporal identification. Consequently, the service provider system 102-1 and/or one or more service provider systems 103-1 may transmit one or more matching content items 177 to the subsystem 111. Additionally or alternatively, in some embodiments, the subsystem 111 first obtain one or more matching adaptable content items 176, then read metadata from the one or more matching adaptable content items 176, and transmit at least a portion of the metadata to the service provider system 102-1 and/or one or more service provider systems 103-1 in order to facilitate matching the metadata with one or more content items 177.

Some embodiments may include the subsystem 111 being configured to perform a search of the repositories 222 for one or more content items 177 that have metadata matching the metadata of one or both of adaptable content items 176 and the segment of programming content 202 in addition to pulling one or more content items 177 from the service provider systems 102-1 and/or 103-1. For example, the subsystem 111 may first perform a search of the repositories 222 for any matching content items 177 and then only pull one or more content items 177 from the service provider systems 102-1 and/or 103-1 when no non-expired content items 177 are found in the search of the repositories 222 that match the metadata with a sufficient match score that indicates a level of correlation satisfying a correlation threshold. In some embodiments, the subsystem 111 may first attempt to pull one or more content items 177 from the service provider system 102-1 and, in the case that no matching non-expired content items 177 are successfully pulled from the service provider system 102-1 within a time threshold after the initial request, then pull one or more content items 177 from one or more service provider systems 103-1. Likewise, the subsystem 111 may attempt to pull one or more content items 177 from a first set of one or more service provider systems 103-1 and, in the case that no matching content items 177 are successfully pulled from the first set of one or more service provider system 103-1 within a time threshold after the initial request, then pull one or more content items 177 from a second set of one or more service provider systems 103-1. In some embodiments, the subsystem 111 may implement all three of the aforementioned stages of pulling content items 177 from the service provider system 102-1, then the first set of one or more service provider systems 103-1, and then a second set of one or more service provider systems 103-1. In such embodiments, the time thresholds may be different for each stage, e.g., decreasing or increasing in time. Additionally, the size of the selected sets of service provider systems 103-1 may be different for each stage, e.g., decreasing or increasing in size. Accordingly, various embodiments may facilitate matching of particularized content items 177 to segments of programming content 202 and/or adaptable content items 176 based at least in part on metadata.

The matching engine 238 may take the identified characteristics of a given segment of programming content 202 as cues to retrieve one or more corresponding adaptable content items 176 and one or more content items 177 for the content splicing engine 242 to output one or more content composites 180 for presentation after the segment of programming content 202 (e.g., at a commercial break) or during the segment of programming content 202 (e.g., as an overlay, in a side window/frame, etc.) to match the identified characteristics of the programming content 202. According to some embodiments, the matching engine 238 may employ one or more artificial intelligence algorithms to identify characteristic patterns in the programming content 202 which may correspond to triggers for intra-event creation of composites 180 for presentation at an upcoming break or during the event.

As one example case out of many possibilities, say a state change in a televised event of programming content 202 occurs (e.g., a score change, one team or competitor leading or falling behind, a takedown, a foul, etc.) and/or temporal progression marker (e.g., the fourth quarter, the second round, etc.) is reached. The subsystem 111 may detect the state change and, in response, initiate creation of composites 180 for presentation at an upcoming break or during the event. Accordingly, the dialogue may trigger composite 180 creation and presentation so that the composite 180 may be dynamically inserted in the content stream within a short time (e.g., substantially, seconds, within a minute, with environments, etc.) after the state change. In various embodiments, the subsystem 111 may detect the state change the way of keyword recognition of a dialogue from an announcer (e.g., detecting words such as touchdown, goal, takedown, foul, minutes on the clock, etc.), sudden changes in crowd noise, and/or image recognition (e.g., detecting graphics displayed with a televised event such as a scoreboard, streaming tickers or overlays typically positioned and/or scrolling across a portion of the display area, etc.).

To facilitate audio recognition, the content composite subsystem 111 (e.g., by way of the matching engine 238) may be configured to detect one or more audio characteristics in adaptable programming content 202. In some embodiments, the matching engine 238 may include an audio analyzer and handling module to facilitate that detection. By way of example, the matching engine 238 may detect one or more audio characteristics in programming content 202 by way of any one or combination of analyzing closed captioning information, analyzing audio, applying voice recognition, acoustic spectrum analysis, comparison to acoustic profiles for types of events, and/or the like.

Some embodiments of the content composite subsystem 111 may store acoustic profiles mapped to types of programming content 202 and corresponding state changes in the processed content repository. Each acoustic profile may specify one or more selected values of acoustic metrics as distinctive markings and/or acoustic categories 214 as characteristics of the types of programming content 202 and corresponding state changes. In various embodiments, the matching engine 238 may analyze the audio tracks metadata track, and/or close captioning information to identify dialogue as distinctive markings of state changes. The matching engine 238 may identify one or more keywords and/or expressions in the dialogue as a dialogue impression for the purposes of characterizing the sample and identifying state changes. The matching engine 238 may compile the keywords and/or expressions of the sample and retain the keywords and/or expressions and corresponding state changes in the dialogue impression. In some cases, the matching engine 238 may correlate the dialogue impression to one or more dialogue categories 212 for similar dialogue impressions and corresponding state changes. In various embodiments, the correlation may be based at least in part on matching selected keywords and/or expressions to identical and/or similar keywords and/or expressions specified for certain dialogue categories 212. The dialogue categories 212 may include categorizations of concept, keyword, expression, and/or the like mapped to corresponding state changes.

Based at least in part on the dialogue impression, the matching engine 238 may create a dialogue profile for a given segment and/or type of programming content 202 and corresponding state changes. The dialogue profile may be retained in any suitable form, such as a file, a list, etc. The content composite subsystem 111 may store dialogue profiles mapped to segments of programming content 202 and corresponding state changes in the processed content repository. Each dialogue profile may specify one or more selected keywords and/or expressions as distinctive markings and/or dialogue categories 212 as characteristics of the segment and/or type of programming content 202 and corresponding state changes.

To facilitate image recognition, some embodiments of the content composite subsystem 111 (e.g., by way of the matching engine 238) may be configured to detect one or more color characteristics in programming content 202, which may include any suitable color characteristic that may be measured recognize alphanumerical images corresponding to such state changes. In some embodiments, the matching engine 238 may include an image analyzer and handling module to facilitate that detection. By way of example, the matching engine 238 may detect one or more color characteristics in programming content 202 by way of any one or combination of pixel identification, detecting color component values, detecting color codes, and/or the like. Some embodiments may sample only portions of images, such as only part of a frame (which could, for example, be specified by identification of pixel coordinates and ranges thereof to define areas of interest). Some embodiments may sample only a central portion of a frame. Other embodiments may only sample a non-central portion, such as a border portion of a frame. Some embodiments may start with one portion of a frame and only sample to until a state change is recognized.

The matching engine 238 may perform correlation based at least in part on correlation rules 218. The matching engine 238 may correlate segments of programming content 202 to state changes based at least in part on one or a combination of such characteristics. In some embodiments, the correlation may be based at least in part on the color profiles, acoustic profiles, and/or dialogue profiles of types and/or segments of programming content 202. In some embodiments, the correlation may be based at least in part on color, dialogue, and/or acoustic categories 212.

The correlation rules 218 may include correlation criteria that could include keywords identified by any one or combination of words, word stems, phrase, word groupings, and/or like keyword information. The correlation criteria could include weightings assigned to dialogue specifications. Hence, within each dialogue bucket, a keyword could be assigned a weight according to its significance. By way of example, more significant keywords could be assigned a greater weight than stop words. Such buckets could be implemented in any suitable manner, including lists, tables, matrices, and/or the like. And within a bucket, characteristics and/or keywords could be organized in a rank order and/or any hierarchical structure according to weight. Some embodiments may have characteristics and/or keywords organized according to decision tree, with contingencies so that only certain combinations of characteristics and/or keywords may be considered. For example, certain characteristics and/or keywords could only have significance if used in conjunction with other keywords, and/or not in conjunction with others.

In some embodiments, the matching engine 238 may employ a scoring system to quantify correlations with a numerical expression, for example, a match score, with higher scores being assigned to higher correlations of segments of programming content 202 with state changes. Higher scores may be assigned for greater extents of matching. For example, a match of three dialogue cues or dialogue categories may be assigned a higher score than a match of only one top dialogue cue and/or dialogue category. As another example, an exact match of words, expressions, and/or dialogue categories may be assigned a higher score than a complimentary match (e.g., where absent an exact match, a word, expression, and/or dialogue category is defined as a complement to another a word, expression, and/or dialogue category).

Further, the matching engine 238 may correlate the state changes to corresponding adaptable content items 176 that the subsystem 111 has stored locally to identify one or more of which that are particularized to some extent to the types of state changes detected. In some embodiments, a set of adaptable content items 176 may be ranked according to correlation such that the strongest matching content item 176 is ranked highest, and the ranked set may be selected for composite 180 creation in the ranked order consequent to the matched segment of programming content 202.

As disclosed herein, the subsystem 111 may determine that the programming content 202 corresponds to a televised content segment for which content composite 180 creation is an option. The subsystem 111 may detect a location corresponding to the computing device 116 and the receiver 111, and may determine from rules 218 whether the provisioning of content composites 180 of certain type are prohibited for the location. In the case where the subsystem 111 determines that there is no prohibition for the location, the subsystem 111 may determine a set of the rules 218 that govern timing restrictions and specifications, event type restrictions and specifications, place and manner restrictions and specifications, and types of adaptations of the adaptable content items 176 with the particularized content items 177 to create the composites 180. Various sets of rules 218 may provide for various types of adaptations of the adaptable content items 176 with the particularized content items 177, and the subsystem 111 may determine which set of rules 218 apply to a given receiver 116e and/or device 116 as a function of the location of the receiver 116e and/or device 116.

The place and manner restrictions and specifications of the rules 218 may govern how and when composites are provisioned with respect to programming content 202 (e.g., as a commercial, as a real-time pop-up, as a real-time overlay, as an inset frame, a sliding and swipable overlay, and/or like), which may be a function of the type of program, type of end user (e.g., demographics), history and patterns of user input and selections, and/or the type of end-user device. For example, a set of rules 218 may specify that composites 180 may only be provided during commercial breaks of program. Another set of rules 218 may specify that composites 180 may be provided as overlays, frames, and/or pop-ups during the televised event.

The rules 218 may require the user opt in and request particularized content items 177. Accordingly, one or more user-selectable options may be presented to the user via the receiver 116e and/or device 116 to allow presentation of particularized content items 177 and/or options to request particularized content items 177. Such user-selectable options may be provided with composites 180 that are presented and during commercial breaks. Likewise, one or more user-selectable options may be presented to the user via the receiver 116e and/or device 116 to prohibit provisioning of particularized content items 177 and/or options to request particularized content items 177. Upon user selection of such prohibition, the subsystem 111 may present alternative content items in lieu of particularized content items 177 and/or options to request particularized content items 177 during commercial breaks, such as content items 176 without particularized content items 177 and/or options to request particularized content items 177 and/or other content items. Consequent to a user opting in, prohibiting, and/or requesting particularized content items 177, one or more communications may be transmitted to the system 102 to indicate the user selection(s). The system 102 may update an account associated with the user and/or endpoint media device 116 accordingly, for example, with storage of user preferences and credits/awards for user interactions with respect to content items 177.

In some embodiments, during a period of time when a content item 176 is being presented with a display of the endpoint device 116 (e.g., with a commercial), a user-selectable option may be presented to allow for user selection to request one or more particularized content items 177 corresponding to the content item 176. In some embodiments, a request for one or more particularized content items 177 corresponding to the content item 176 may be made by way of one or more buttons on a remote control associated with a television receiver 116e that are configured for selection of a displayed user-selectable option or otherwise to request a particularized content item 177 corresponding to the content item 176 being output by the television receiver 116e for display. In addition or in alternative, one or more user-selectable options may be available during the time period for on-screen selection via a remote control and a selection function (e.g., an on-screen selector such as a hovering indicator of any suitable form) and/or one or more buttons on television receiver 116*e* that allows a user to interact with television receiver 116*e*. In some embodiments, an indication of the user-selectable option associated with a content item 176 represented on-screen could be presented to indicate that the user may select an option to obtain further information.

Additionally or alternatively, in some embodiments, a selection of a user-selectable option and/or another type of request may be made orally by user and recognized with a voice recognition device integrated with the remote control or integrated with or otherwise communicatively coupled to the endpoint media device 116. For example, the voice recognition device may correspond to a smart speaker with virtual assistant. Thus, a user may user opt in and request particularized content items 177 via voice recognition.

Particularized content items 177 may be provisioned to endpoint media devices 116 in one or a combination of ways. In some embodiments, particularized content items 177 may be integrated and displayed with the adaptable content item 176. Such presentations of the particularized content items 177 may be captured by an endpoint media device 116 via scanning with a scanner, taking a photo with a camera, saving a screenshot, and/or the like. Additionally or alternatively, particularized content items 177 may transferred to an account accessible by the user of the endpoint media device 116. Additionally or alternatively, particularized content items 177 may be provisioned to a device 116 by way of one or combination of application installed on the device 116, communications from a receiver 116*e*, communications from the service provider system 102-1, a near field communication interface (e.g., contactless interface, Bluetooth, optical interface, etc.), wireless communications interfaces capable of communicating through a cellular data network, or through Wi-Fi, such as with a wireless local area network (WLAN), and/or the network 120. By way of example, a composite 180 may be presented via a television receiver 116*e* on a display 160 with one or more user-selectable options that allow redirection of composites 180 and/or particularized content items 177 to a secondary device 116 consequent to user selection. Further, one or more user-selectable options may be presented to the user via the receiver 116*e* and/or device 116 to allow content composite 180 and/or particularized content item 177 provisioning to a secondary device 116 concurrently with the presentation of the televised content segment.

The user-selectable options presented with the composite 180 may allow for taking actions, such as selecting one or more URLs, hyperlinks, click-to-call, and/or voice-activate-to-call options to one or more platforms, websites, and/or sites for further information, ordering, requesting, and/or accessing products and/or services. As disclosed herein, the user-selectable options may include one or more options to transition provisioning of one or more composites 180 to a secondary device 116 and/or to request notifications from the one or more platforms, websites, and/or sites be sent to the secondary device 116 so that the secondary device 116 may be used to interact with the platforms and sites via an application installed on the secondary device 116. In that way, a user may interact with the one or more platforms and sites via the secondary device 116 while viewing the televised event on a primary display associated with a receiver 116*e* and/or primary device 116.

According to one option, the secondary device 116 may receive the same content, including composites 180 as commercial segments and/or overlays, being displayed on the display device 160 with simulcasting to the secondary device 116 so that the secondary device 116 need only display the augmented content. According to another option, the television receiver 116*e* may provide the programming content to the display device 160, and the secondary device 116 may receive the programming content and splice composites 180 into the content displayed with the device 116. In various embodiments, the device 116 may receive the composites 180 for splicing from the receiver 116*e*, may receive the composites 180 for splicing from the service provider system 102-1, and/or may receive adaptable content items 176 and content items 177 from the receiver 116*e* and/or the system 102-1 in order that the device 116 may create provision composites 180 therefrom. In some modes of operation, the television receiver 116*e* may present alternative content items with the display device 160 in lieu of content composites 180, while the content composites may be shunted to the secondary device 116. Thus, the secondary device 116 may receive composites 180 that would otherwise be displayed on the display device 160. In some embodiments and options, the receiver 116*e* may not cast to the televised event, but the device 116 may present composites 180 without the televised event. For example, according to some options, an application for the device 116 may be downloaded, installed, and initiated to facilitate content provisioning on the device 116 and interaction with one or a combination of the receiver 116*e*, system 102-1, and/or one or more systems 103-1. Accordingly, various embodiments may provide various user-selectable options for transitioning from just viewing a televised event to displaying and interacting with composites 180 and service provider systems 103-1 via a secondary device 116, while a televised event corresponding to the composites 180 is being displayed on another device such as display device 160 the receiver 116*e*.

In accordance with the geo-specific rules 218, the subsystem 111 may detect a trigger for composite 180 creation that corresponds to a need for presentation of one or more composites 180 during an upcoming break in the programming content 202 corresponding to an event and/or during the presentation programming content 202 corresponding to the event. Detecting a trigger may include determining timing specifications of the event and a temporal progression in the event (e.g., the fourth quarter, the second round, etc.), detecting a state change in the event (e.g., a score change, one team or competitor leading or falling behind, etc.), and/or the like. In various embodiments, a trigger may correspond to the matching engine 238 processing the metadata associated with programming content 202 and/or processing the audio and/or video content of the programming content 202 to identify an upcoming break in the programming content 202. This may include processing the metadata to identify flags or other indicators of the timing specifications of a commercial break. Additionally or alternatively, this may include the audio recognition, video recognition, and/or closed captioning recognition disclosed above to identify timing specifications, temporal progression, and/or state changes as triggers for composite 180 creation.

When the subsystem 111 detects a trigger, the subsystem 111 may receive and/or select from one or more adaptable content items 176 provided by the system 102-1 as matching particular segments of the televised content segment and one or more content items 177 to generate and output for display, utilizing the content splicing engine 242, one or more composites 180 to display as a commercial during a programming break after a particular segment or as an intra-program overlay, frame, window, pop-up, and/or the like presented concurrently with the televised event. For example, a content item 177 may include text, one or more images, links, URLs, buttons, other user interface elements, and/or the like which the content splicing engine 242 may aggregate, process, format, crop, rescale, and/or otherwise prepare and include in composites 180 for insertion into the content stream for output with the programming content 202 and/or during breaks of the programming content 202. Thus, the content splicing engine 242 may identify content portions for augmentation by processing the content item 177, reading the content item 177 or certain portions thereof, and determine portions for augmentation in video segments. In some embodiments, portions of images and/or frames of the adaptable content item 176 may be overwritten with captured content from the content item 177.

The content splicing engine 242 may identify one or more portions of adaptable content item 176 to be augmented based at least in part on content item 177, which may, in various embodiments, be identified by image analysis and/or analysis of tag data that defines one or more areas within frames that correspond to certain portions represented within the frames for augmentation. As disclosed herein, such tag data could define the area of interest in any suitable way in various embodiments which could be by way of any one or combination of mattes, masks, pixel identification (which could, for example, include identification of pixel coordinates and ranges thereof to define areas of interest), pixel color component characteristics such as color component values, overlays, and/or the like, allowing for correlation to the area to be augmented in any suitable way. In some embodiments, a processor (such as a main processor, a core processor, digital signal processor, and/or like) may take a definition of the augmentation area with respect to one or more reference frames and may perform auto-correlation of related images in a video stream to identify/define the augmentation areas in other frames of the video sequence that represent the portion to be augmented. Image characteristics (e.g., color, brightness, etc.) of the area of interest with respect to the reference frame(s) could be measured, quantified, and/or otherwise identified, and matched with measured image characteristics of the other frames to define the area to be augmented in multiple frames in an image-changing sequence. Accordingly, certain embodiments may allow for handling the complexity of multiple on-screen options by differentiating particular areas in dynamic, image-changing content.

As illustrated by FIG. 3, the content processing subsystem 111 may include a learning engine 239 that may be an analysis engine that employs machine learning. The learning engine 239 may further employ deep learning. Accordingly, the learning engine 239 may facilitate machine learning or, more specifically, deep learning, to facilitate creation, development, and/or use of viewer pattern data 216. As disclosed herein, the subsystem 111 may determine a program, show, etc. that the viewer actually is viewing, is about to view (e.g., the televised event is scheduled to play on the channel that the viewer is currently viewing), or is likely to view as determined with the learning engine 239. The subsystem 111 may push information indicating the televised event to one or more service provider systems 102-1 and/or 103-1. In some embodiments, the service provider system 102-1 may select one or more adaptable content items 176 matching the televised content segment for transfer to the subsystem 111 which, as disclosed herein, may be a part of the content provider system 102 and/or may be part of the receiver 116e and/or devices 116. The subsystem 111 may select from the one or more adaptable content items 176 as matching particular segments of the televised segment and, utilizing a content splicing engine 242 in some embodiments, may output one or more corresponding content composites 180 for display after the particular segments and/or simultaneously with the particular segments.

In various embodiments, one or more of the service provider systems 102-1, 103-1 may select one or more particularized content items 177 matching the televised event for transfer to the subsystem 111. In some embodiments, one or more of the service provider systems 102-1, 103-1 may select a set of one or more particularized content items 177 for transfer (e.g., based on recency of information updates corresponding to the content items 177) for transfer to the subsystem 111, and the subsystem 111 may determine which content items 177 from the set match the televised content segment. As disclosed above, the content composite subsystem 111 may include a matching engine 238 that may include logic to implement and/or otherwise facilitate any taxonomy, classification, categorization, correlation, mapping, qualification, scoring, organization, and/or the like features disclosed herein.

Figure 5:
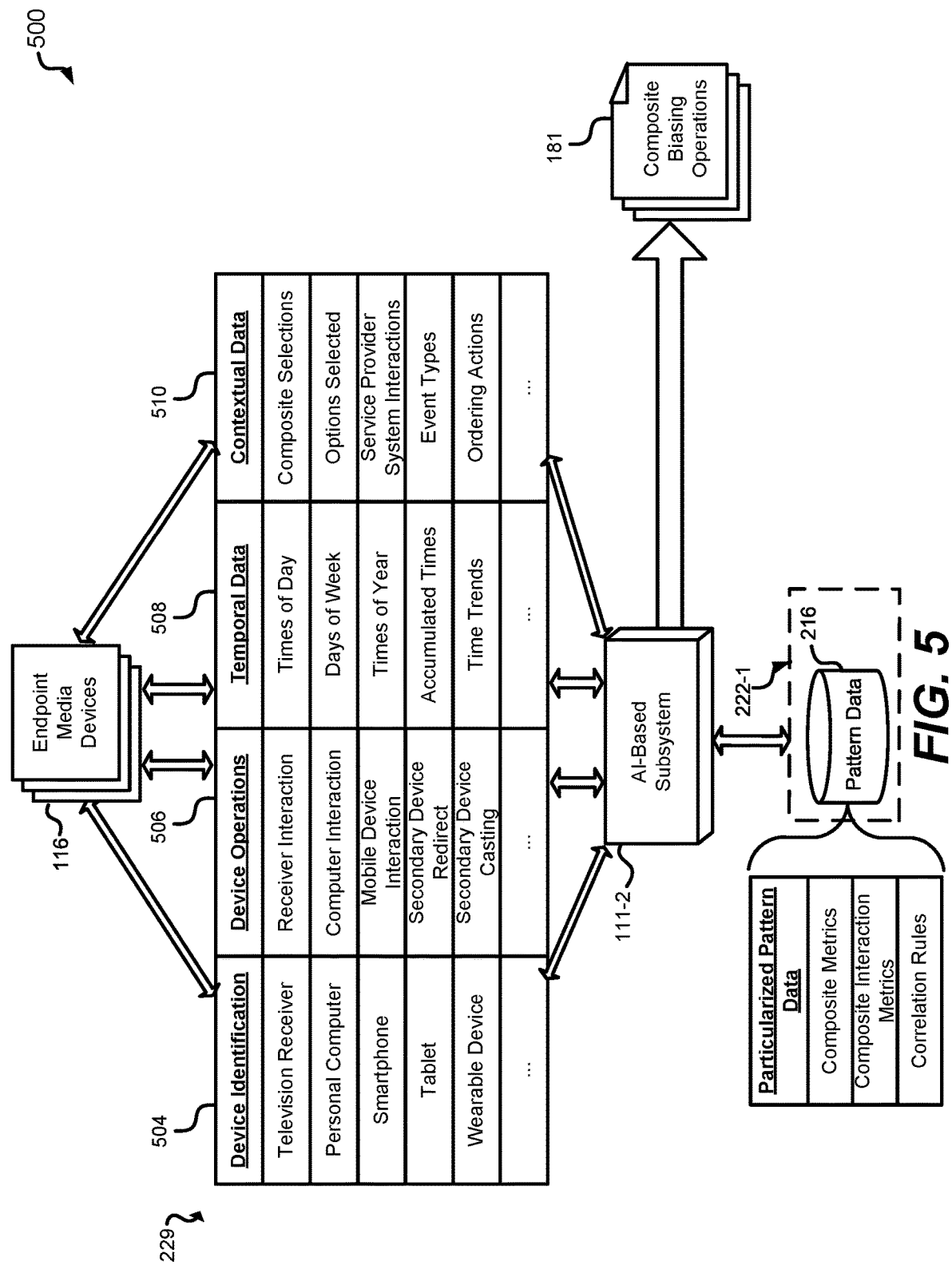
FIG. 5 illustrates certain aspects of subsystem data flow, in accordance with disclosed embodiments of the present disclosure.

FIG. 5 illustrates certain aspects of the AI-based subsystem data flow 500, in accordance with various embodiments of the present disclosure. The content processing subsystem 111 may be configured to gather observation data 229, which may be specific to one or more particular identified users and/or may be generally related to particular endpoint media devices 116. The observation data 229 may be gathered from one or more devices 116, aggregated, consolidated, and transformed into viewer pattern profiles that include personalized pattern data 216.

In embodiments where the learning engine 239 is included in an endpoint media device 116, the device 116 may be a self-observer that may additionally gather additional observation data 229. In various embodiments, the data from the one or more devices 116 may be retrieved and/or received by the content processing subsystem 111 via one or more data acquisition interfaces, which may include interfaces of the content processing subsystem 111, the one or more endpoint media devices 116, and/or the like—through network(s) 120 in various embodiments, through any suitable means for direct communication, and/or through any other suitable means of transferring data. According to various embodiments where the subsystem 111 is included in a service provider system 102-1, observation data 229 may be actively gathered and/or pulled from the one or more endpoint media devices 116.

As disclosed herein, in various embodiments, the one or more data acquisition interfaces may include one or more APIs that define protocols and routines for interfacing with the one or more endpoint media devices 116 and which may specify API calls to/from one or more endpoint media devices 116. In various embodiments, the APIs may include a plug-in to integrate with an application of one or more endpoint media devices 116. The API translation profiles may translate the protocols and routines of the data source component and/or system to integrate at least temporarily with the system and allow one-way communication to the system 102-1 and/or two-way communication with system 102-1 in various embodiments by way of API calls.

Some embodiments of the subsystem 111 may aggregate observation data 229 to derive device identification data 504, device operations 506, temporal data 508, and/or contextual data 510. The device identification data 504 may include any suitable data for identifying and tracking particular receivers 116e and devices 116; associated accounts, subscribers, and viewers; and/or the like disclosed herein.

The device operations data 506 may include any suitable data for identifying and tracking device operations and interactions as those disclosed herein. The contextual data 510 may include metrics and patterns of viewer interactions/responses pursuant to provisioning of content composites 180 and service provider system 103-1 biasing 181. For example, viewer responses to content composites 180 provisioning may include indications of whether the viewer selected a user-selectable options provided with composites 180, the types of such selections, and/or types of consequent interactions with service provider systems 103-1. For example, the metrics and patterns may take into account whether the viewer opted out of content composites 180, whether the viewer selected links of composites 180 to interact with the platforms and sites of one or more service provider systems 103-1, whether the viewer selected options to redirect content composites 180 and/or notifications from service provider systems 103-1 to a secondary device 116, which options and/or service provider systems 103-1 the viewer selected, whether the viewer used redeemable content items, QR codes, etc. and the types of the viewer's orders, purchases, and other interactions with service provider systems 103-1, and/or the like. The temporal data 508 may include metrics such as any information to facilitate detection, recognition, and differentiation of one or combination of temporal factors correlated or which the content processing subsystem 111 correlates to other observation data 229 such as device identification data 504, contextual data 510, and/or the like. For example, the temporal data 508 may include time of day information, time of week information, time of year information, holiday information, etc. when the viewer made selections, orders, purchases, redemptions of redeemable content items, offers, promo codes, etc.; and/or the like.

The learning engine 239 may map one or a combination of the various extra-composite metrics of the observation data 229 to the metrics of the particular composites 180 provided to a particular viewer. Based at least in part on taking into account such observation data 229 as part of a feedback loop, the learning engine 239 may employ an ongoing learning mode to develop personalized pattern data 216 for particular viewers or content receivers/devices generally, and to confirm, correct, and/or refine determinations made for personalized pattern data 216 for particular viewers or content receivers/devices generally. The content processing subsystem 111 may be configured to employ machine learning to process the observation data 229 and the content items 180 and to derive and develop the personalized pattern data 216. The content processing subsystem 111 may be configured to employ deep learning to process the observation data 229 and the content items 180 and to derive and develop the personalized pattern data 216. The learning engine 239 may be configured to perform any one or combination of features directed to matching or otherwise correlating the observation data 229—such as the device identification data 504, the device operation identification data 506, the temporal data 508, the contextual data 510, descriptive information of the content items 180, and/or the like—with intra-content metrics of the content items 180. The learning engine 239 may include logic to implement and/or otherwise facilitate any taxonomy, classification, categorization, correlation, mapping, qualification, scoring, organization, and/or the like features disclosed herein. In some embodiments, the learning engine 239 may include the matching engine 238.

The learning engine 239 may include a reasoning module to make logical inferences from a set of the detected and differentiated data to infer one or more patterns of activity for particular viewers and/or receivers/devices generally. A pattern-based reasoner could be employed to use various statistical techniques in analyzing the data in order to infer personalized pattern data 216 from the observation data 229. A transitive reasoner may be employed to infer relationships from a set of relationships related to the observation data 229. In various embodiments, the system automatically establishes and develops the personalized pattern data 216. However, the personalized pattern data 216 may be set up and/or tailored by users. With various embodiments, the personalized pattern data 216 may be automatically established and developed by the system.

The feedback could be used for training the system to heuristically adapt conclusions, profiles, correlations, attributes, triggers, patterns, and/or the like to learn particular viewers and adapt content composite 180 provisioning to particular viewers, which may include requesting, searching for, and/or selecting particular types of adaptable content items 176 and/or content items 177 (e.g., which may be based at least in part on the metadata features disclosed herein) for content composite 180 creation. For example, the learning engine 239 may learn that a particular viewer tends to interact with content composites 180 that are directed to only certain types of products and/or services. Such interaction object type differentiation may be on the macro level, such as recognizing that a viewer tends to interact more with composites 180 directed to certain types of products, services, and/or offers and not other types of products, services, and/or offers. Additionally, the learning engine 239 may learn that a particular viewer tends to interact with particular content composites 180 and/or types only after the particular content composite 180 and/or type has been presented to the viewer X number of times. Accordingly, the subsystem 111 may bias content composites 180 provisioning toward the types of products and/or services that tend to elicit viewer interaction, and decrease composite 180 provisioning frequency or cease provisioning for other types.

Further, the learning engine 239 may learn that a particular viewer tends to interact with content composites 180 that are directed to only types of products, services, and/or offers within a particular category. Accordingly, the subsystem 111 may likewise bias content composites 180 provisioning toward such types of products, services, and/or offers and decrease or cease provisioning with respect to other types. Further, viewer interaction differentiation may be on the micro level, such as recognizing that a viewer tends to interact more with composites 180 directed to certain types of offers, redeemable content items, promotions, etc. Accordingly, the subsystem 111 may likewise bias content composites 180 provisioning toward such types and decrease or cease provisioning with respect to other types.

Further, in situations where a pattern of more micro-level interactions detected for particular viewer, the subsystem 111 biasing 181 of composites 180 may include serial provisioning of composites 180 in a serial drill-down manner such that the first composites 180 provisioned may be directed to a more macro-level outcome and one or more composites 180 subsequently provisioned may be directed to more micro-level outcomes in accordance with the detected pattern. Thus, disclosed embodiments may provide for serial matching of composites 180 with respect to one another in order to provision the composites 180 with a trend that matches the detected pattern. As one possible example out of many, when viewer interaction with macro-level composite 180 directed to a macro-level product and/or service (e.g., a vehicle) results in a macro-level outcome by the viewer (e.g., an purchase, order, etc. of the vehicle), the biasing 181 may include ceasing provisioning of repeats and variations of the macro-level composite 180 to the viewer and may further include subsequently provisioning more micro-level content composites 180 directed to more micro-level outcomes (e.g., complementary products/services, such as warranties, accessories, etc.).

As part of such learning and adaptation processes, the subsystem 111 may bias composite 180 provisioning toward use of content items 177 from certain service provider systems 103-1 over other service provider systems 103-1. The learning engine 239 may perform correlation based at least in part on correlation rules that govern correlation of the personalized pattern data 216 to content items 177 and corresponding sources of the content items 177 based at least in part on metrics and availabilities of the content items 177 from the particular source systems 103-1. In various embodiments, the correlation may be based at least in part on the profiles of the service provider systems 103-1. In analyzing content items 177 received for particular service provider systems 103-1, the subsystem 111 may identify patterns of types of content items 177 and mapped which types of content items 177 are provided by which service provider systems 103-1. Based at least in part on such mapping, the subsystem 111 may prioritize use of content items 177 from particular service provider systems 103-1 where the content items 177 are of viewers directed to the types of interactions that match interaction patterns of a particular viewer.

Further, such biasing 181 of content items 177 from one or more systems 103-1 may include prioritizing attempts to pull content items 177 from one or more systems 103-1 based at least in part on speed and responsiveness of systems 103-1. The subsystem 111 may aggregate and develop service provider system metrics based at least in part on the speed and responsiveness of systems 103-1 demonstrated with previous attempts to pull one or more content items 177 within one or more historical time windows (e.g., previous day, five days, week, month, year, etc.). The service provider systems 103-1 may be scored based at least in part on the metrics, and an individual scores may be utilized in identifying preferential biasing 181 an attempt to pull content items 177 from respective systems 103-1. For example, the subsystem 111 may attempt to pull one or more content items 177 from a first set of one or more service provider systems 103-1 that has the highest score based on previous performance with respect to speed, timeliness, and a matching content items 177. In the case that no matching content items 177 are successfully pulled from the first set of one or more service provider system 103-1 within a time threshold after the initial request, then the subsystem 111 may pull one or more content items 177 from a second set of one or more service provider systems 103-1 that have lower scores. Such serial stages attempt to pull content items 177 may be continued with additional sets of lower scored systems 103-1. The time thresholds may be different for each stage (e.g., decreasing or increasing in time) and the size of the selected sets of service provider systems 103-1 may be different for each stage (e.g., decreasing or increasing in size). In cases where multiple such stages are necessary, the subsystem 111 may subsequently adjust metrics for the systems 103-1, taking into account the performance demonstrated with such stages of attempt to pull objects 177.

In some embodiments, the device identification data 504 may include endpoint media device 116 mappings that logically associate endpoint media devices 116 that are linked based on one or more commonalities. For example, the learning engine 239 may learn that a set of endpoint media devices 116 are mappable to a particular household, to a particular company, and/or the like. Consequently, the learning engine 239 may learn observation data 229 may be differentiated not only on individual bases (e.g., with respect to individual devices 116, accounts, user profiles, etc.), but also on collective bases (i.e., with respect to sets of devices 116, accounts, user profiles, etc.). Further, the adapting and provisioning of content items 176, 177, and/or composites 180 may be based at least in part on the learning of such logical associations. For example, each endpoint media device 116 of a set of endpoint media devices 116 mapped to a particular household may be provisioned with a common set of content items 176, 177, and/or composites 180, regardless of the previous content items 176, 177, and/or composites 180 provisioned to each endpoint media device 116 in the set. In some embodiments, the common set of content items 176, 177, and/or composites 180 may be related to, but different from, one or more previous content items 176, 177, and/or composites 180 provisioned to one or more endpoint media devices 116 in the set for a shared experience. Likewise, the common set of content items 176, 177, and/or composites 180 may be related to one or more interactions one or more endpoint media device 116 in the set with one or more previous content items 176, 177, and/or composites 180 provisioned to one or more of the endpoint media devices 116. For example, a user selection of a hyperlink in a content composite 180 may trigger a related content item 177 being provisioned to all endpoint media devices 116 in the set. In like manner, any of the features disclosed herein with respect to adapting, provisioning, and biasing content items 176, 177, and/or composites 180 may be based at least in part on such linking of endpoint media devices 116.

Figure 6:
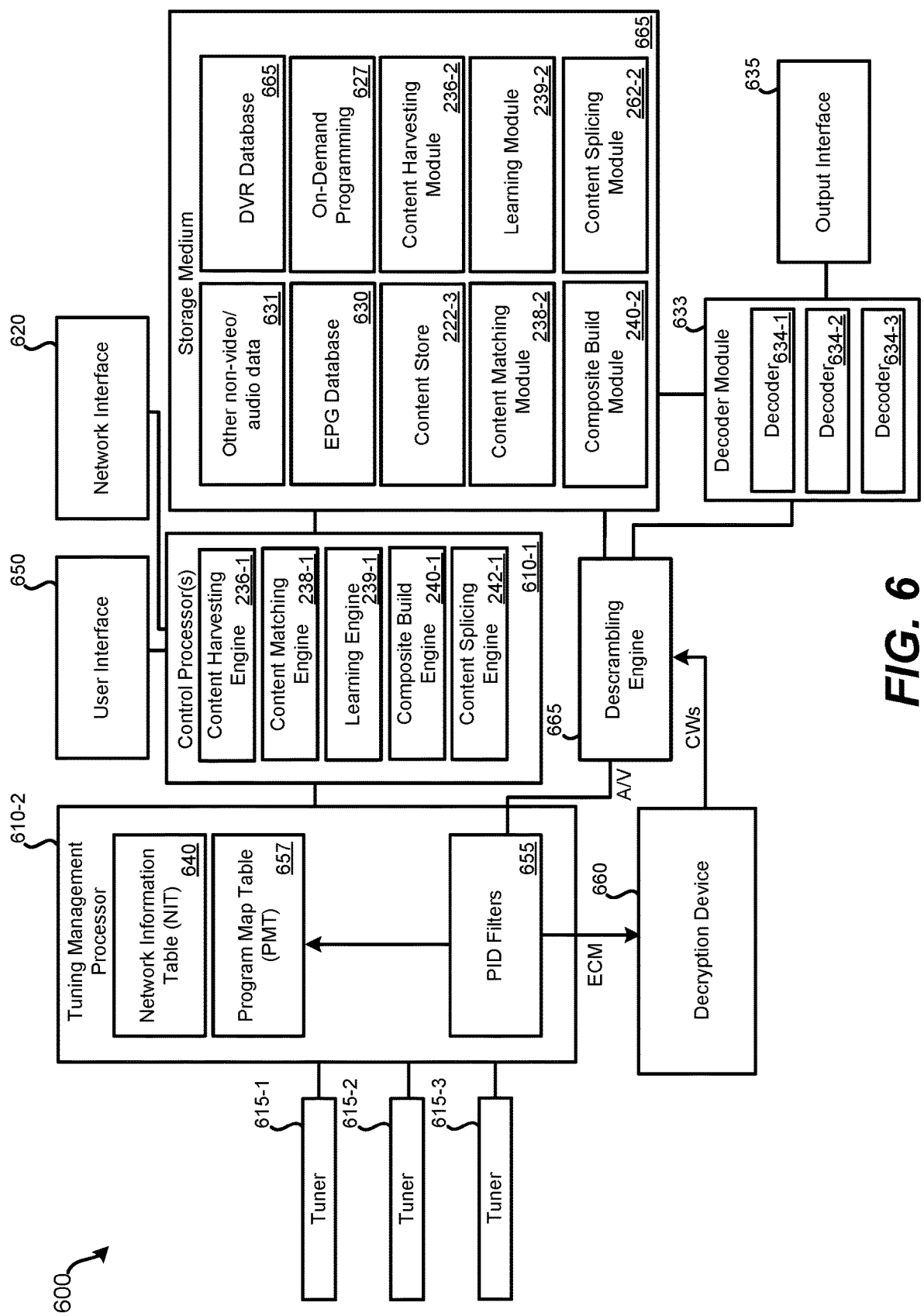
FIG. 6 illustrates a receiver that makes use of, interacts with, and/or at least partially includes the content composite subsystem, in accordance with disclosed embodiments of the present disclosure.

FIG. 6 illustrates a receiver 600 that makes use of, interacts with, and/or at least partially includes the subsystem 111, in accordance with disclosed embodiments of the present disclosure. Certain embodiments of the receiver 600 may include set top boxes (STBs), television receivers, and over-the-top receivers. In some embodiments, the receiver 600 may correspond to the television receiver 116e. In various embodiments, in addition to being in the form of a STB, a receiver may be incorporated as part of another device, such as a television or other form of display device, such as a computer, smartphone, tablet, or other handheld portable electronic device. For example, a television may have an integrated receiver (which does not involve an external STB being coupled with the television). One or a combination of the content harvesting engine 236-1, the content matching engine 238-1, learning engine 239-1, content composite build engine 240-1, and/or content splicing engine 242-1 may be provided in conjunction with content harvesting module 236-2, the content matching module 238-2, content augmentation module 240-2, and/or content splicing module 242-2 to implement various functionalities of the content composite subsystem 111 into the receiver 600.

The receiver 600 may represent receiver 116e of FIG. 1 and may be in the form of a STB that communicates with a display device such as a television. The receiver 600 may be incorporated as part of a television, such as the display device 160 of FIG. 1 or television 600 of FIG. 6, etc. The receiver 600 may include: processors 610 (which may include control processor 610-1, tuning management processor 610-2, and possibly additional processors), tuners 615, network interface 620, non-transitory computer-readable storage medium 625, electronic programming guide (EPG) database 630, networking information table (NIT) 640, digital video recorder (DVR) database 645, on-demand programming 627, content store 222-3, user interface 650, decryption device 660, decoder module 633, interface 635, and/or descrambling engine 665. In other embodiments of receiver 600, fewer or greater numbers of components may be present. It should be understood that the various components of receiver 600 may be implemented using hardware, firmware, software, and/or some combination thereof. Functionality of components may be combined; for example, functions of descrambling engine 665 may be performed by tuning management processor 610-2. Further, functionality of components may be spread among additional components; for example, PID filters 655 may be handled by separate hardware from program map table 657. The receiver 600 may be in data communication with service providers, such as by way of network interface 620.

The processors 610 may include those configured to perform processes such as tuning to a particular channel, accessing and displaying EPG information from the EPG database 630, and/or receiving and processing input from a user. For example, the processors 610 may include one or more processors dedicated to decoding video signals from a particular format, such as MPEG, for output and display on a television and for performing decryption, if required. It should be understood that the functions performed by various modules of FIG. 6 may be performed using one or more processors. As such, for example, functions of the descrambling engine 665 may be performed by the control processor 610-1.

The control processor 610-1 may communicate with tuning management processor 610-2. The control processor 610-1 may control the recording of television channels based at least in part on timers stored in the DVR database 645. The control processor 610-1 may also provide commands to the tuning management processor 610-2 when recording of a television channel is to cease. In addition to providing commands relating to the recording of television channels, the control processor 610-1 may provide commands to the tuning management processor 610-2 that indicate television channels to be output to the decoder module 633 for output to a display device. The control processor 610-1 may also communicate with the network interface 620 and the user interface 650. The control processor 610-1 may handle incoming data from network interface 620, including network transport streams received from over-the-top service providers. The control processor 610-1 may handle incoming data from the network interface 620, including network transport streams received from the user interface 650, which may include user input received by way of one or more human interface devices. Additionally, the control processor 610-1 may be configured to output data via the network interface 620. The control processor 610 may also be configured to perform image and audio analysis, such as to identify contextual aspects present in an audio or video stream, for example facial recognition or voice recognition.

The tuners 615 may include one or more tuners used to tune to transponders that include broadcasts of one or more television channels that may be received from a satellite or cable system, for example. In the illustrated embodiment of receiver 600, three tuners are present (tuner 615-1, tuner 615-2, and tuner 615-3). In other embodiments, two or more than three tuners may be present, such as four, six, or eight tuners. Each tuner contained in the tuners 615 may be capable of receiving and processing a single transponder stream from a satellite transponder at a given time, for example. As such, a single tuner may tune to a single transponder stream at a given time. If the tuners 615 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of the tuners 615 may be used to receive the signal containing the multiple television channels for presentation and/or recording. The tuners 615 may receive commands from the tuning management processor 610-2. Such commands may instruct the tuners 615 which frequencies are to be used for tuning.

The network interface 620 may be used to communicate via an alternate communication channel with a television service provider, if such communication channel is available. The primary communication channel may be via satellite (which may be unidirectional to the receiver 600) and the alternate communication channel (which may be bidirectional) may be via a network, such as the Internet. Referring back to FIG. 1, receiver 116e may be able to communicate with content provider system 102-1 via a network 120, such as the Internet. This communication may be bidirectional: data may be transmitted from the receiver 116e to the content provider system 102-1 and from the content provider system 102-1 to the receiver 116e. Referring back to FIG. 6, the network interface 620 may be configured to communicate via one or more networks, such as the Internet, to communicate with content provider system 102-1 of FIG. 1. Other information may be transmitted and/or received via the network interface 620 such as adaptable content items 176, content items 177, metadata, and/or the like as disclosed herein.

The storage medium 625 may represent one or more non-transitory computer-readable storage mediums. The storage medium 625 may include memory and/or a hard drive. The storage medium 625 may be used to store information received from one or more satellites and/or information received via the network interface 620. The storage medium 625 may store information related to the EPG database 630, augmentation module 632 and related preferences, other non-video/audio data 631, DVR database 645, commercial database 646, and/or on-demand programming 627. Recorded television programs may be stored using the storage medium 625 as part of the DVR database 645. The storage medium 625 may be partitioned or otherwise divided (such as into folders) such that predefined amounts of the storage medium 625 are devoted to storage of television programs recorded due to user-defined timers and stored television programs recorded due to provider-defined timers.

The EPG database 630 may store information related to television channels and the timing of programs appearing on such television channels. The EPG database 630 may be stored using the storage medium 625, which may be a hard drive. Information from the EPG database 630 may be used to inform users of what television channels or programs are popular and/or provide recommendations to the user. Information from the EPG database 630 may provide the user with a visual interface displayed by a television that allows a user to browse and select television channels and/or television programs for viewing and/or recording. Information used to populate the EPG database 630 may be received via the network interface 620 and/or via satellites, such as the satellite 106 of FIG. 1 via the tuners 615. For instance, updates to the EPG database 630 may be received periodically via satellite. The EPG database 630 may serve as an interface for a user to control DVR functions of the receiver 600, and/or to enable viewing and/or recording of multiple television channels simultaneously. Information from EPG database 630 may be output as a video stream to a display device. A particular user may issue commands indicating that an EPG interface be presented. A user issuing a command that an EPG be displayed may constitute a change command. In some embodiments, content composites 180 may be created and presented in conjunction with the EPG. For example, content composites 180 could pertain to televised events indicated in the EPG. Hence, content composite 180 features may extend to EPG views in some embodiments.

The network information table (NIT) 640 may store information used by the receiver 600 to access various television channels. The NIT 640 may be stored locally by a processor, such as the tuning management processor 610-2 and/or by the storage medium 625. Information used to populate the NIT 640 may be received via satellite (or cable) through the tuners 615, may be received via the network interface 620, such as from the television service provider. As such, information present in the NIT 640 may be periodically updated. In some embodiments, NIT 640 may be locally-stored by the receiver 600 using the storage medium 625. Generally, the NIT 640 may store information about a service provider network, such as a satellite-based service provider network. Information that may be present in the NIT 640 may include: television channel numbers, satellite identifiers (which may be used to ensure different satellites are tuned to for reception of desired television channels), frequency identifiers, transponder identifiers for various television channels, antenna identifiers (which may be used to ensure different antennas are tuned to for reception of desired television channels), radio frequency identifiers, and/or subchannel identifiers for various television channels. In some embodiments, the NIT 640 may contain additional data or additional tables may be stored by the receiver. For example, while specific audio PIDs and video PIDs may not be present in the NIT 640, a channel identifier may be present within the NIT 640 which may be used to look up the audio PIDs and video PIDs in another table, such as a program map table (PMT). In some embodiments, a PID associated with the data for the PMT is indicated in a separate table, program association table (PAT), which is not illustrated in FIG. 6. A PAT may be stored by the receiver in a similar manner to the NIT. For example, a PMT may store information on audio PIDs, and/or video PIDs. A PMT stores data on ECM (entitlement control message) PIDs for television channels that are transmitted on a transponder stream, transport stream, or digital broadcast. If, for a first television channel, multiple television channels are to be tuned to, the NIT 640 and/or the PMT 657 may indicate a second television channel that is to be tuned to when a first channel is tuned to; this may allow for switching to output of the second television channel for different commercials, for example.

A table, such as the NIT, PAT, or PMT may store indications of PIDs that are related to supplemental audio content for individual channels or other forms of content. For instance, each television channel may be associated with a different supplemental audio PID. If supplemental audio content is to be transmitted for a given television channel, packets containing the supplemental audio are transmitted to the receiver having its associated supplemental audio content PID. This PID could be distinct from any of the audio programs of the television programming (e.g., the first audio program, second audio program (SAP), actual descriptive audio). In some embodiments, supplemental audio content is transmitted using the same transponder stream as the television channel or content to which the supplemental audio content corresponds. In some embodiments, a single supplemental audio PID is used to identify supplemental audio for multiple television channels, such as all the television channels on a given transponder. A second identifier present within the supplemental audio data may be used to distinguish for which television channel the supplemental audio data corresponds.

Based at least in part on information in the NIT, it may be possible to determine the proper satellite and transponder to which to tune for a particular television channel, or to determine the proper antenna and frequency to which to tune to for a particular television channel. In some embodiments, the NIT may list a particular frequency to which to tune for a particular television channel. Once tuned to the proper satellite/transponder/antenna/frequency, the PMT PID may be used to retrieve a program map table that indicates the PIDs for audio and video streams of television channels transmitted by that transponder.

While a large portion of storage space of the storage medium 625 may be devoted to storage of television programming, a portion may be devoted to storage of non-audio/video data, such as the EPG database 630 and other non-video/audio data 631. This "other" data may permit the receiver 600 to function properly. In some embodiments, at least ten gigabytes are allocated to such other data. For example, if the NIT 640 is stored by the storage medium 625, it may be part of the other non-video/audio data 631.

The decoder module 633 may serve to convert encoded video and audio into a format suitable for output to a display device. For instance, the decoder module 633 may receive MPEG video and audio from the storage medium 625, the network interface 620, or the descrambling engine 665 to be output to a television. MPEG video and audio from the storage medium 625 may have been recorded to the DVR database 645 as part of a previously-recorded television program. The decoder module 633 may convert the MPEG video and audio into a format appropriate to be displayed by a television or other form of display device and audio into a format appropriate to be output from speakers, respectively. The decoder module 633 may have the ability to convert a finite number of television channel streams received from the storage medium 625, the network interface 620, or the descrambling engine 665 simultaneously. For instance, each of the decoders 634 within the decoder module 633 may be able to only decode a single television channel at a time.

While a television channel is being decoded by a decoder of the decoders 634, the television channel is not necessarily output to a display device via the television interface 635. For instance, a television channel may be decoded but not output to allow for seamless or near-seamless switching to the television channel when output is desired. For example, if a second television channel is to be output for presentation during commercial breaks on a first television channel, the second television channel and the first television channel may each be continuously decoded by different decoders of the decoder module 633 to allow for fast switching between the channels. Without a television channel being continuously decoded, fast switching may be difficult due at least in part to the format in which the channel is encoded. For instance, for MPEG encoding, it may be necessary to first decode an I-frame before certain subsequent (or earlier) received frames may be properly decoded. The output of the decoder, which is provided to the television interface 635, may be controlled by the control processor 610-1, or some other processor. While the decoder module 633 is illustrated as having three decoders 634 (decoder 634-1, decoder 634-2, and decoder 634-3), in other embodiments, a greater or fewer number of decoders may be present in the receiver 600.

The television interface 635 may serve to output a signal to a television (or another form of display device) in a proper format for display of video and playback of audio. As such, the television interface 635 may output one or more television channels, stored television programming from the storage medium 625 (e.g., television programs from the DVR database 645, television programs from on-demand programming 627 and/or information from the EPG database 630) to a television for presentation.

Digital Video Recorder (DVR) functionality may permit a television channel to be recorded for a period of time. DVR functionality of the receiver 600 may be managed by the control processor 610-1. The control processor 610-1 may coordinate the television channel, start time, and stop time of when recording of a television channel is to occur. In various embodiments, adaptable content items 176 could be selected and inserted into the presentation stream prior to recording, during recording, and/or upon playback of the recording. The DVR database 645 may store information related to the recording of television channels. The DVR database 645 may store timers that are used by the control processor 610-1 to determine when a television channel should be tuned to and its programs recorded to the DVR database 645 of storage medium 625. In some embodiments, a limited amount of the storage medium 625 may be devoted to the DVR database 645. Timers may be set by the television service provider and/or one or more users of the receiver 600.

User profiles may also be stored in the storage medium 645 and may include stored user preferences that may be inferred by the television receiver 600 based at least in part on viewing history. The television receiver 600 may communicate user profile information to the service system(s) 102-1, 103-1 to request adaptable content items 176 and content items 177 tailored to the inferred user preferences to provision composites 180 in accordance with certain embodiments disclosed herein. The user profiles may include profiles for multiple users or may include a single profile for the television receiver in general. In some embodiments, the user profiles may include preferences for customized content presentation adjustments disclosed herein. The preferences could include customized viewing interests, such as programming content, announcement content, product content, and/or the like that corresponds to augmented content selections relating to recognized actors and/or products. The user profiles may further include user feedback, via user-selectable options, received from the user regarding customizations. The feedback data may be used to refine the customizations for particular viewers and types of content customizations.

The on-demand programming 627 may represent additional television programming stored by the storage medium 625. The on-demand programming 627 may include television programming that was not recorded to the storage medium 625 via a timer (either user- or provider-defined). Rather, on-demand programming is programming provided to the receiver directly for storage by the receiver and for later presentation to one or more users. In various embodiments, adaptable content items 176 could be selected and inserted into the presentation stream prior to or upon playback of the recording.

The user interface 650 may include a remote control (physically separate from the receiver 600) and/or one or more buttons on the receiver 600 that allow a user to interact with the receiver 600. The user interface 650 may be used to select a television channel for viewing, view information from the EPG database 630, and/or program a timer stored to DVR database 645, wherein the timer is used to control the DVR functionality of the control processor 610-1. The user interface 650 may also be used to transmit commands to the receiver 600 and make user selections to customize user preferences, make selections with respect to content items 176, 177, and content composites 180.

Referring back to the tuners 615, television channels received via satellite (or cable) may contain at least some scrambled data. Packets of audio and video may be scrambled to prevent unauthorized users (e.g., nonsubscribers) from receiving television programming without paying the television service provider. When a tuner of the tuners 615 is receiving data from a particular transponder of a satellite, the transponder stream may be a series of data packets corresponding to multiple television channels. Each data packet may contain a packet identifier (PID), which, in combination with the NIT 640 and/or the PMT 657, may be determined to be associated with a particular television channel. Particular data packets, referred to as entitlement control messages (ECMs), may be periodically transmitted. ECMs may be associated with another PID and may be encrypted; the receiver 600 may use the decryption device 660 to decrypt ECMs. Decryption of an ECM may only be possible if the user has authorization to access the particular television channel associated with the ECM. When an ECM is determined to correspond to a television channel being stored and/or displayed, the ECM may be provided to the decryption device 660 for decryption.

The decryption device 660 may be a removable or non-removable smart card. When the decryption device 660 receives an encrypted ECM, the decryption device 660 may decrypt the ECM to obtain some number of control words. In some embodiments, from each ECM received by the decryption device 660, two control words are obtained. In some embodiments, when the decryption device 660 receives an ECM, it compares the ECM to the previously received ECM. If the two ECMs match, the second ECM is not decrypted because the same control words would be obtained. In other embodiments, each ECM received by the decryption device 660 is decrypted; however, if a second ECM matches a first ECM, the outputted control words will match; thus, effectively, the second ECM does not affect the control words output by the decryption device 660. The decryption device 660 may be permanently part of the receiver 600 or may be configured to be inserted and removed from the receiver 600. In some embodiments, the control processor 610-1, the tuning management processor 610-2, or other hardware may be able to determine that a received ECM has not changed from the previous iteration, and therefore not provide the repeated ECM to the smart card, since the same control word(s) will be obtained.

The tuning management processor 610-2 may be in communication with the tuners 615 and the control processor 610-1. The tuning management processor 610-2 may be configured to receive commands from the control processor 610-1. Such commands may indicate when to start/stop recording a television channel and/or when to start/stop causing a television channel to be output to a television. The tuning management processor 610-2 may control the tuners 615. From the tuners 615, the tuning management processor 610-2 may receive transponder streams of packetized data. From the network interface 620, the tuning management processor 610-2 may receive network transport stream of packetized data. As previously detailed, some or all of these packets may include a PID that identifies the content of the packet.

The tuning management processor 610-2 may be configured to create one or more PID filters 655 that sort packets received from the tuners 615 and/or the network interface 620 based at least in part on the PIDs. When a tuner is initially tuned to a particular frequency (e.g., to a particular transponder of a satellite), a PID filter may be created based at least in part on the PMT data. The PID created, based at least in part on the PMT data packets, may be known because it is stored as part of the NIT 640 or another table, such as a program association table (PAT). From the PMT data packets, PMT may be constructed by the tuning management processor 610-2.

The PID filters 655 may be configured to filter data packets based at least in part on PIDs. In some embodiments, the PID filters 655 are created and executed by the tuning management processor 610-2. For each television channel to be output for presentation or recorded, a separate PID filter may be configured. In other embodiments, separate hardware may be used to create and execute such PID filters. Depending on a television channel selected for recording/viewing, a PID filter may be created to filter: (1) the video packets associated with the television channel; (2) the audio packets associated with the television channel; and (3), if enabled, supplemental audio content for use in conjunction with interactive content. The PMT 657 may store the particular assignments of PIDs for individual television channels. For example, if a transponder data stream includes multiple television channels, data packets corresponding to a television channel that is not desired to be stored or displayed by the user may be ignored by the PID filters 655 and not routed to the descrambling engine 665, the decryption device 660, or the control processor 610-1. As such, only data packets corresponding to the one or more television channels desired to be stored and/or displayed may be filtered and passed to either the descrambling engine 665 or the decryption device 660; other data packets may be ignored. For each television channel, a stream of video packets, a stream of audio packets (one or both of the audio programs), a stream of supplemental audio content, and/or a stream of ECM packets may be present, each stream identified by a PID. In some embodiments, a common ECM stream may be used for multiple television channels. Additional data packets corresponding to other information, such as updates to the NIT 640, may be appropriately routed by the PID filters 655. At a given time, one or multiple PID filters may be executed by the tuning management processor 610-2.

The descrambling engine 665 may use the control words output by the decryption device 660 in order to descramble video and/or audio corresponding to television channels for storage and/or presentation. Video and/or audio data contained in the transponder data stream received by the tuners 615 may be scrambled. Video and/or audio data may be descrambled by the descrambling engine 665 using a particular control word. Which control word output by the decryption device 660 to be used for successful descrambling may be indicated by a scramble control identifier present within the data packet containing the scrambled video or audio. Descrambled video and/or audio may be output by the descrambling engine 665 to the storage medium 625 for storage (in the DVR database 645) and/or to the decoder module 633 for output to a television or other presentation equipment via the television interface 635.

For simplicity, the receiver 600 of FIG. 6 has been reduced to a block diagram; commonly known parts, such as a power supply, have been omitted. Further, some routing between the various modules of the receiver 600 has been illustrated. Such illustrations are for exemplary purposes only. The state of two modules not being directly or indirectly connected does not indicate the modules cannot communicate. Rather, connections between modules of the receiver 600 are intended only to indicate possible common data routing. It should be understood that the modules of the receiver 600 may be combined into a fewer number of modules or divided into a greater number of modules.

Further, the components of the television receiver 600 may be part of another device, such as built into a television. The television receiver 600 may include one or more instances of various computerized components, such as disclosed in relation to computer systems disclosed further herein. While the television receiver 600 has been illustrated as a satellite receiver, it is to be appreciated that techniques below may be implemented in other types of television receiving devices, such as cable receivers, terrestrial receivers, IPTV receivers or the like. In some embodiments, the television receiver 600 may be configured as a hybrid receiving device, capable of receiving content from disparate communication networks, such as satellite and terrestrial television broadcasts. In some embodiments, the tuners may be in the form of network interfaces capable of receiving content from designated network locations.

Figure 7:
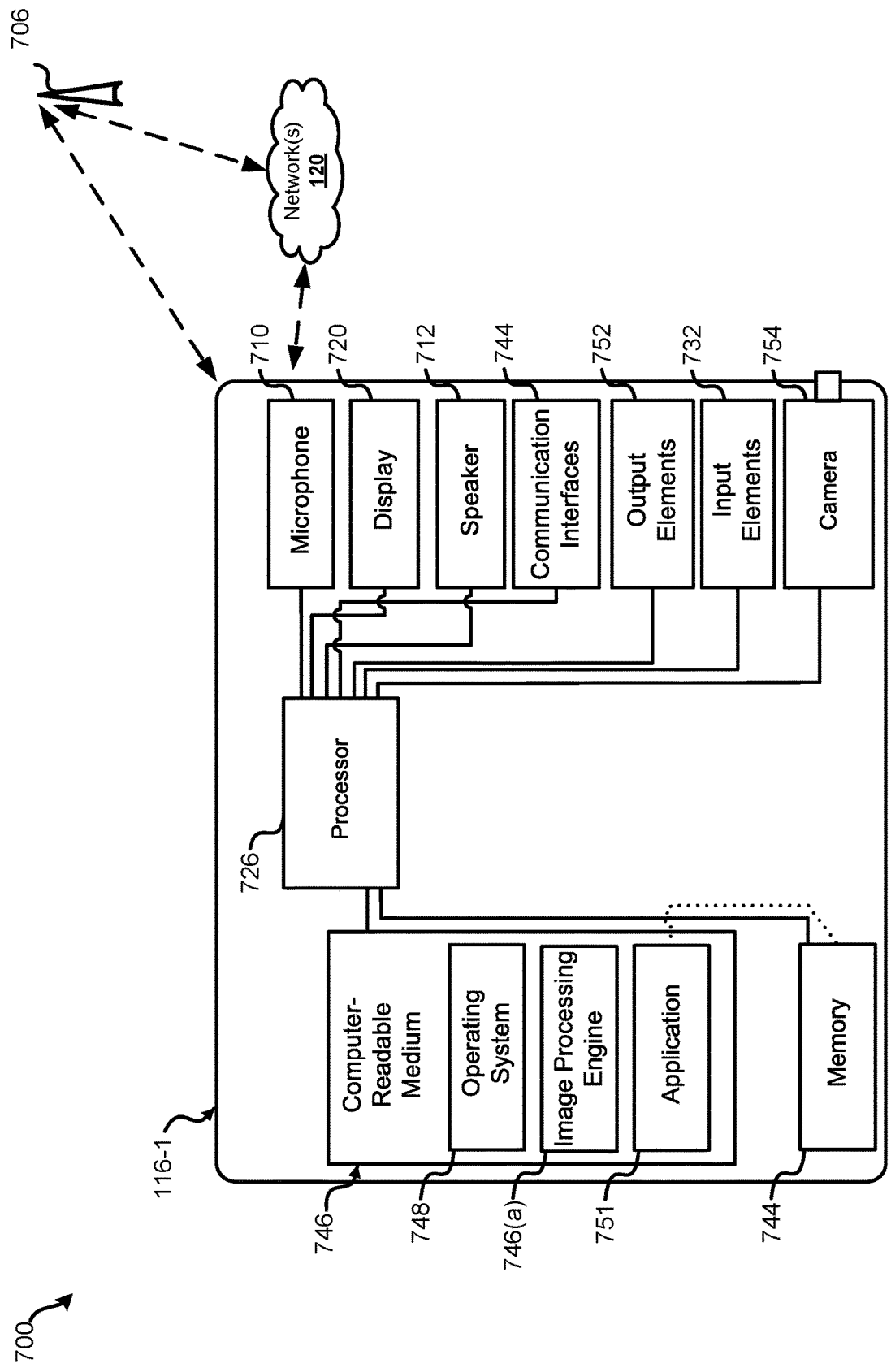
FIG. 7 illustrates a system including one non-limiting example of a computing device configured to make use of, interact with, and/or at least partially include the content composite subsystem, in accordance with disclosed embodiments of the present disclosure.

FIG. 7 is a block diagram of a system 700 including one non-limiting example of a computing device 116 configured to make use of, interact with, and/or at least partially include the subsystem 111, in accordance with disclosed embodiments of the present disclosure. The computing device 116 may be a portable device suitable for sending and receiving information to/from the receiver 116e and over a network to/from remote data sources (e.g., service providers 103-1 and online content sources 112) in accordance with embodiments described herein. For example, in various embodiments, the computing device 116 may correspond to one or more of computing devices 116a, 116b, 116c, 116d depicted in FIG. 2.

In some embodiments, the computing device 116 may be provided with an application 751, which may, in some embodiments, correspond to a mobile application configured to run on the computing device 116 to facilitate various embodiments of this disclosure. For example without limitation, the mobile application 751 may transform the computing device 116 into an adaptive content splicing device to facilitate features of various embodiments disclosed herein. In various embodiments, the mobile application 751 may allow the device 116 to be configured to provide one or a combination of the content harvesting engine 236-1, the content matching engine 238-1, learning engine 239-1, composite build engine 240-1, and/or content splicing engine 242-1 may be provided in conjunction with the content harvesting module 236-2, the content matching module 238-2, composite build module 240-2, and/or content splicing module 242-2 to implement various functionalities of the content composite subsystem 111 into the device 116.

In various embodiments, the application 751 can be any suitable computer program that can be installed and run on the computing device 116, and, in some embodiments, the application 751 may not be a mobile app but may be another type of application, set of applications, and/or other executable code configured to facilitate embodiments disclosed herein. The application 751 may be provided in any suitable way. For non-limiting example, the application 751 may be made available from a website, an application store, the service provider 102-1, etc. for download to the computing device 116; alternatively, it may be pre-installed on the computing device 116.

In various embodiments, the computing device 116 configured with the application 751 may provide one or more display screens that may each include one or more user interface elements. A user interface may include any text, image, and/or device that can be displayed on a display screen for providing information to a user and/or for receiving user input. A user interface may include one or more widgets, text, text boxes, text fields, tables, grids, charts, hyperlinks, buttons, lists, combo boxes, checkboxes, radio buttons, and/or the like. As shown in FIG. 7, the computing device 116 includes a display 720 and input elements 732 to allow a user to input information into the computing device 116. By way of example without limitation, the input elements 732 may include one or more of a keypad, a trackball, a touchscreen, a touchpad, a pointing device, a microphone, a voice recognition device, or any other appropriate mechanism for the user to provide input.

In various embodiments, the computing device 116 may pull content items 176, content items 177, and/or composites 180 from the receiver 116e and/or from systems 102-1 and/or 103-1 via the network 120 in order to facilitate the content composites 180 to a user of the computing device 116 through the application 751. The application 751 can include a utility that communicates with the receiver 116e and/or from online data sources via the network 120 to control downloading, displaying, caching, and/or other operations concerning the handling of content items 176, content items 177, and/or composites 180. The application 751 and the computing device 116 may cooperate with the receiver 116e to facilitate tracking of (and customizations of user profiles and other features disclosed herein based at least in part on) user selections in response to content items displayed through the one or more additional applications.

The user selection of a user-selectable option corresponding to the application 751 may involve any one or combination of various user inputs. The user selection may be in the form of a keyboard/keypad input, a touch pad input, a track ball input, a mouse input, a voice command, etc. For example, the content item may be selected by the user by pointing and clicking on a content item. As another example, a content item may be selected by an appropriate tap or movement applied to a touch screen or pad of the computing device 116.

The computing device 116 includes a memory 734 communicatively coupled to a processor 736 (e.g., a microprocessor) for processing the functions of the computing device 116. The computing device 116 may include at least one antenna 738 for wireless data transfer to communicate through a cellular network, a wireless provider network, and/or a mobile operator network, such as GSM, for example without limitation, to send and receive Short Message Service (SMS) messages or Unstructured Supplementary Service Data (USSD) messages. The computing device 116 may also include a microphone 740 to allow a user to transmit voice communication through the computing device 116, and a speaker 742 to allow the user to hear voice communication. The antenna 738 may include a cellular antenna (e.g., for sending and receiving cellular voice and data communication, such as through a network such as a 3G, 4G, or 5G network). In addition, the computing device 116 may include one or more interfaces in addition to the antenna 738, e.g., a wireless interface coupled to an antenna.

The communications interfaces 744 can provide a near field communication interface (e.g., contactless interface, Bluetooth, optical interface, infrared interface, etc.) and/or wireless communications interfaces capable of communicating through a cellular network, such as GSM, or through Wi-Fi, such as with a wireless local area network (WLAN). Accordingly, the computing device 116 may be capable of transmitting and receiving information wirelessly through both short range, radio frequency (RF), cellular, and Wi-Fi connections. The computing device 116 may access the network 108 through a wireless link to an access point. For example, a computing device 116 may access the network 108 through one or more access points 706. The access points 706 may be of any suitable type or types. For example, an access point 706 may be a cellular base station, an access point for wireless local area network (e.g., a Wi-Fi access point), an access point for wireless personal area network (e.g., a Bluetooth access point), etc. The access point 706 may connect the computing device 116 to the network 108, which may include the Internet, an intranet, a local area network, private communication networks, etc. In some embodiments, the communications interfaces 744 may allow computing device 116 to receive programming content cast from the television receiver. For example, the programming content from the television receiver may be indirectly transmitted via a local network (e.g., via Wi-Fi) or directly transmitted to the computing device via a casting device integrated with the television receiver or coupled to the television receiver (e.g., via a dongle). As another example, the television receiver may cast programming content to the computing device via a wired connection (e.g., via one or more of HDMI, USB, lightning connector, etc.). Some embodiments may provide for simulcasting such that the same programming that is being displayed on the display device is being displayed on the computing device 116 simultaneously or substantially simultaneously.

The computing device 116 can also include at least one computer-readable medium 746 coupled to the processor 736, which stores application programs and other computer code instructions for operating the device, such as an operating system (OS) 748. In some embodiments, the application 751 may be stored in the memory 734 and/or computer-readable media 746. Again, the example of computing device 116 is non-limiting. Other devices, such as those disclosed herein, may be used.

The mobile computing device 736 can additionally include an integrated camera 754, capable of capturing images and/or video, and output elements 752. In certain embodiments, the mobile computing device 736 may include a non-transitory computer-readable storage medium, e.g., memory 734, for storing images captured with the camera 754. In alternative embodiments, the mobile computing device 736 receives image data from an image capture device that is not integrated with the mobile computing device 736 (e.g., from the receiver 116e and/or the online content sources 112).

In some embodiments, the computer-readable medium 746 can also include an image-processing engine 746(a). The image-processing engine 746(a) can perform image processing of images captured by the camera 754 to perform recognition of programming content 202 in accordance with embodiments disclosed herein. The image-processing engine 746(a) may analyze the images and generate accessible interface elements using the identified and/or analyzed images. With some embodiments, the image-processing engine 746(a) is separate from the application 751. In other embodiments, the application 751 may include the image-processing engine 746(a). In some embodiments, the computing device 116 provides the captured images to the receiver 116e, and the receiver 116e performs the image processing and analysis. In some embodiments, the computing device 116 provides the captured images to the service provider 102-1, and the service provider performs the image processing and analysis.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Figure 8:
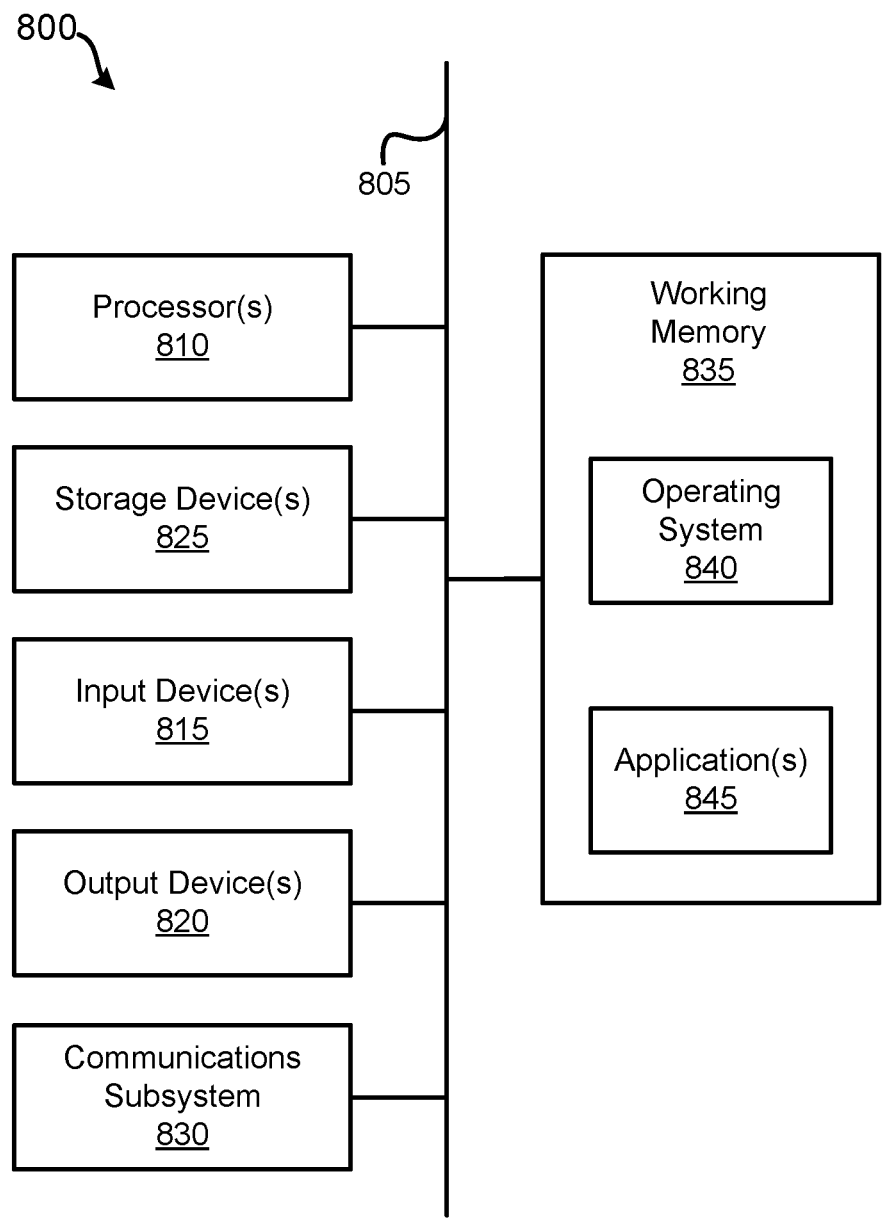
FIG. 8 illustrates a computer system, in accordance with disclosed embodiments of the present disclosure.

A computer system as illustrated in FIG. 8 may be incorporated as part of the previously described computerized devices, such as a television receiver 116e, device(s) 116, and/or content provider system 102-1. FIG. 8 provides a schematic illustration of one embodiment of a computer system 800 that can perform various steps of the methods provided by various embodiments. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can be electrically coupled via a bus 805 (or may otherwise be in communication, as appropriate). The hardware elements may include one or more processors 810, including without limitation one or more general-purpose processors and/or one or more special-purpose processors (such as digital signal processing chips, graphics acceleration processors, video decoders, and/or the like); one or more input devices 815, which can include without limitation a mouse, a keyboard, remote control, and/or the like; and one or more output devices 820, which can include without limitation a display device, a printer, and/or the like.

The computer system 800 may further include (and/or be in communication with) one or more non-transitory storage devices 825, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 800 might also include a communications subsystem 830, which can include without limitation a modem, a network card (wireless or wired), an infrared communication device, a wireless communication device, and/or a chipset (such as a Bluetooth™ device, an 802.11 device, a Wi-Fi device, a WiMAX device, cellular communication device, etc.), and/or the like. The communications subsystem 830 may permit data to be exchanged with a network (such as the network described below, to name one example), other computer systems, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840, device drivers, executable libraries, and/or other code, such as one or more application programs 845, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 825 described above. In some cases, the storage medium might be incorporated within a computer system, such as computer system 800. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 800 and/or might take the form of source and/or installable code, which, upon compilation and/or installation on the computer system 800 (e.g., using any of a variety of generally available compilers, installation programs, compression/decompression utilities, etc.), then takes the form of executable code.

As mentioned above, in one aspect, some embodiments may employ a computer system (such as the computer system 800) to perform methods in accordance with various embodiments of the invention. According to a set of embodiments, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another computer-readable medium, such as one or more of the non-transitory storage device(s) 825. Merely by way of example, execution of the sequences of instructions contained in the working memory 835 might cause the processor(s) 810 to perform one or more procedures of the methods described herein.

The terms "machine-readable medium," "machine-readable media," "computer-readable storage medium," "computer-readable storage media," "computer-readable medium," "computer-readable media," "processor-readable medium," "processor-readable media," and/or like terms as used herein, refer to any medium that participates in providing data that causes a machine to operate in a specific fashion. These mediums may be non-transitory. In an embodiment implemented using the computer system 800, various computer-readable media might be involved in providing instructions/code to processor(s) 810 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 825. Volatile media include, without limitation, dynamic memory, such as the working memory 835.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 810 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 800.

The communications subsystem 830 (and/or components thereof) generally will receive signals, and the bus 805 then might carry the signals (and/or the data, instructions, etc. carried by the signals) to the working memory 835, from which the processor(s) 810 retrieves and executes the instructions. The instructions received by the working memory 835 may optionally be stored on a non-transitory storage device 825 either before or after execution by the processor(s) 810.

It should further be understood that the components of computer system 800 can be distributed across a network. For example, some processing may be performed in one location using a first processor while other processing may be performed by another processor remote from the first processor. Other components of computer system 800 may be similarly distributed. As such, computer system 800 may be interpreted as a distributed computing system that performs processing in multiple locations. In some instances, computer system 800 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

Furthermore, the example embodiments described herein may be implemented as logical operations in a computing device in a networked computing system environment. The logical operations may be implemented as: (i) a sequence of computer implemented instructions, steps, or program modules running on a computing device; and (ii) interconnected logic or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Also, the terms in the claims have their plain, ordinary meaning unless otherwise explicitly and clearly defined by the patentee. The indefinite articles "a" or "an," as used in the claims, are defined herein to mean one or more than one of the element that the particular article introduces; and subsequent use of the definite article "the" is not intended to negate that meaning. Furthermore, the use of ordinal number terms, such as "first," "second," etc., to clarify different elements in the claims is not intended to impart a particular position in a series, or any other sequential character or order, to the elements to which the ordinal number terms have been applied.

What is claimed:

1. A method for adapting content items to device operations of an endpoint media device, the method comprising:
    creating, by one or more processing devices, a first content composite for delivery in a packet stream from a content provider system via one or more networks, where the first content composite comprises an adaptable content item corresponding to a set of one or more audio and/or video packets corresponding to audio and/or video content;
    causing transmission of the first content composite where, consequent to delivery of the first content composite to a first endpoint media device or a second endpoint media device, the first endpoint media device or the second endpoint media device performs at least one operation relating to a second content item of the first content composite represented by one or more images, where the adaptable content item is modified based at least in part on the second content item;

processing at least one communication received from the first endpoint media device, the second endpoint media device, or a remote system that is remote from the one or more processing devices, the first endpoint media device, and the second endpoint media device, the at least one communication indicative of the at least one operation relating to the second content item of the first content composite;

aggregating, based at least in part on the processing the at least one communication, a set of observation data corresponding to indications of detected operations associated with the first endpoint media device and/or the second endpoint media device and mapped to a set of one or more content items, the set of one or more content items comprising the second content item; and based at least in part on the set of observation data, adapting a second content composite so that the second content composite is modified based at least in part on a third content item, and providing the second content composite for presentation facilitated by one or both of the first endpoint media device and the second endpoint media device.

2. The method for adapting content items to device operations of an endpoint media device as recited in claim 1, where the content composite is created least in part by:
configuring a containerization object with i) a container flag that indicates the adaptable content item and ii) containerization specifications to facilitate performance of a set of one or more operations by the first endpoint media device and/or the second endpoint media device with respect to the adaptable content item consequent to the delivery of the content composite.

3. The method for adapting content items to device operations of an endpoint media device as recited in claim 1, where the at least one operation relating to the second content item corresponds to a selection of a user-selectable interface element mapped to the second content item.

4. The method for adapting content items to device operations of an endpoint media device as recited in claim 3, where, consequent to the selection of a user-selectable interface element mapped to the second content item, at least a portion of the second content item is transferred to one or both of the first endpoint media device and the second endpoint media device.

5. The method for adapting content items to device operations of an endpoint media device as recited in claim 1, where, consequent to the selection of a user-selectable interface element mapped to the second content item, a fourth content item is transferred to one or both of the first endpoint media device and the second endpoint media device.

6. The method for adapting content items to device operations of an endpoint media device as recited in claim 1, where the at least one operation relating to the second content item corresponds to an image capture of at least a portion of an image facilitated by the second content item.

7. The method for adapting content items to device operations of an endpoint media device as recited in claim 1, the method further comprising:
based at least in part on the aggregated set of observation data, learning, by the one or more processing devices, one or more metrics of media device interactions with a set of one or more content composites and mapping the one or more metrics to the first endpoint media device and/or the second endpoint media device; and
where the adapting the second content composite is based at least in part on the learned one or more metrics of media device interactions.

8. The method for adapting content items to device operations of an endpoint media device as recited in claim 7, where the one or more metrics of media device correspond to indicia of one or more times of: the first endpoint media device and/or the second endpoint media device having output the second content item for display, and/or a selection of a user-selectable interface element mapped to the second content item.

9. A system to adapt content items to device operations of an endpoint media device, the system comprising:
one or more processing devices; and
memory communicatively coupled with and readable by the one or more processing devices and having stored therein processor-readable instructions which, when executed by the one or more processing devices, cause the one or more processing devices to perform:
creating a first content composite for delivery in a packet stream from a content provider system via one or more networks, where the first content composite comprises an adaptable content item corresponding to a set of one or more audio and/or video packets corresponding to audio and/or video content;
causing transmission of the first content composite where, consequent to delivery of the first content composite to a first endpoint media device or a second endpoint media device, the first endpoint media device or the second endpoint media device performs at least one operation relating to a second content item of the first content composite represented by one or more images, where the adaptable content item is modified based at least in part on the second content item;
processing at least one communication received from the first endpoint media device, the second endpoint media device, or a remote system that is remote from the one or more processing devices, the first endpoint media device, and the second endpoint media device, the at least one communication indicative of the at least one operation relating to the second content item of the first content composite;
aggregating, based at least in part on the processing the at least one communication, a set of observation data corresponding to indications of detected operations associated with the first endpoint media device and/or the second endpoint media device and mapped to a set of one or more content items, the set of one or more content items comprising the second content item; and
based at least in part on the set of observation data, adapting a second content composite so that the second content composite is modified based at least in part on a third content item, and providing the second content composite for presentation facilitated by one or both of the first endpoint media device and the second endpoint media device.

10. The system to adapt content items to device operations of an endpoint media device as recited in claim 9, where the first content composite is created least in part by:
configuring a containerization object with i) a container flag that indicates the adaptable content item and ii) containerization specifications to facilitate performance of a set of one or more operations by the first endpoint media device and/or the second endpoint media device with respect to the adaptable content item consequent to the delivery of the content composite.

11. The system to adapt content items to device operations of an endpoint media device as recited in claim 9, where the at least one operation relating to the second content item corresponds to a selection of a user-selectable interface element mapped to the second content item.

12. The system to adapt content items to device operations of an endpoint media device as recited in claim 11, where, consequent to the selection of a user-selectable interface element mapped to the second content item, at least a portion of the second content item is transferred to one or both of the first endpoint media device and the second endpoint media device.

13. The system to adapt content items to device operations of an endpoint media device as recited in claim 9, where, consequent to the selection of a user-selectable interface element mapped to the second content item, a fourth content item is transferred to one or both of the first endpoint media device and the second endpoint media device.

14. The system to adapt content items to device operations of an endpoint media device as recited in claim 9, where the at least one operation relating to the second content item corresponds to an image capture of at least a portion of an image facilitated by the second content item.

15. The system to adapt content items to device operations of an endpoint media device as recited in claim 9, the one or more processing devices to further perform:
based at least in part on the aggregated set of observation data, learning, one or more metrics of media device interactions with a set of one or more content composites and mapping the one or more metrics to the first endpoint media device and/or the second endpoint media device; and
where the adapting the second content composite is based at least in part on the learned one or more metrics of media device interactions.

16. The system to adapt content items to device operations of an endpoint media device as recited in claim 15, where the one or more metrics of media device correspond to indicia of one or more times of: the first endpoint media device and/or the second endpoint media device having output the second content item for display, and/or a selection of a user-selectable interface element mapped to the second content item.

17. One or more non-transitory, machine-readable media having machine-readable instructions thereon which, when executed by one or more processing devices, cause the one or more processing devices to perform:
creating a first content composite for delivery in a packet stream from a content provider system via one or more networks, where the first content composite comprises an adaptable content item corresponding to a set of one or more audio and/or video packets corresponding to audio and/or video content;
causing transmission of the first content composite where, consequent to delivery of the first content composite to a first endpoint media device or a second endpoint media device, the first endpoint media device or the second endpoint media device performs at least one operation relating to a second content item of the first content composite represented by one or more images, where the adaptable content item is modified based at least in part on the second content item;
processing at least one communication received from the first endpoint media device, the second endpoint media device, or a remote system that is remote from the one or more processing devices, the first endpoint media device, and the second endpoint media device, the at least one communication indicative of the at least one operation relating to the second content item of the first content composite;
aggregating, based at least in part on the processing the at least one communication, a set of observation data corresponding to indications of detected operations associated with the first endpoint media device and/or the second endpoint media device and mapped to a set of one or more content items, the set of one or more content items comprising the second content item; and
based at least in part on the set of observation data, adapting a second content composite so that the second content composite is modified based at least in part on a third content item, and providing the second content composite for presentation facilitated by one or both of the first endpoint media device and the second endpoint media device.

18. The one or more non-transitory, machine-readable media as recited in claim 17, where the first content composite is created least in part by:
configuring a containerization object with i) a container flag that indicates the adaptable content item and ii) containerization specifications to facilitate performance of a set of one or more operations by the first endpoint media device and/or the second endpoint media device with respect to the adaptable content item consequent to the delivery of the content composite.

19. The one or more non-transitory, machine-readable media as recited in claim 17, where the at least one operation relating to the second content item corresponds to a selection of a user-selectable interface element mapped to the second content item.

20. The one or more non-transitory, machine-readable media as recited in claim 19, where, consequent to the selection of a user-selectable interface element mapped to the second content item, at least a portion of the second content item is transferred to one or both of the first endpoint media device and the second endpoint media device.

* * * * *